United States Patent
Kizawa

(10) Patent No.: US 10,309,282 B2
(45) Date of Patent: Jun. 4, 2019

(54) REDUCING AGENT SUPPLY DEVICE AND METHOD FOR CONTROLLING REDUCING AGENT SUPPLY DEVICE

(71) Applicant: Komatsu Ltd., Minato-ku, Tokyo (JP)

(72) Inventor: Hirofumi Kizawa, Oyama (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 67 days.

(21) Appl. No.: 15/526,562

(22) PCT Filed: Dec. 11, 2014

(86) PCT No.: PCT/JP2014/082821
§ 371 (c)(1),
(2) Date: May 12, 2017

(87) PCT Pub. No.: WO2016/092665
PCT Pub. Date: Jun. 16, 2016

(65) Prior Publication Data
US 2017/0328253 A1 Nov. 16, 2017

(51) Int. Cl.
*F01N 11/00* (2006.01)
*F01N 3/08* (2006.01)
(Continued)

(52) U.S. Cl.
CPC ........... *F01N 3/208* (2013.01); *F01N 3/0821* (2013.01); *F01N 11/005* (2013.01); *F02B 37/12* (2013.01);
(Continued)

(58) Field of Classification Search
CPC ...... F01N 11/005; F01N 3/0821; F01N 3/208; F01N 2550/05; F01N 2610/02;
(Continued)

(56) References Cited

U.S. PATENT DOCUMENTS

2010/0031639 A1* 2/2010 Kwon ............... F01N 3/208
60/286
2011/0000196 A1 1/2011 Kasahara

FOREIGN PATENT DOCUMENTS

EP          2905441        8/2015
JP          2009-215891    9/2009
(Continued)

OTHER PUBLICATIONS

Machine Translation of JP 2014218973 to Kojima.*
(Continued)

*Primary Examiner* — Brandon D Lee
(74) *Attorney, Agent, or Firm* — Fish & Richardson P.C.

(57) ABSTRACT

A reduction-causing agent supply device includes a tank to store a reduction-causing agent, a pumping unit to pump the reduction-causing agent, a reduction-causing agent supply passage to supply the reduction-causing agent, an injection nozzle to inject the reduction-causing agent into an exhaust pipe, a drawing-back unit to draw the reduction-causing agent toward the tank, and a controller. After stop of an engine, the controller performs: reduction-causing agent drawing-back process of drawing the reduction-causing agent toward the tank and introducing exhaust gas from the injection nozzle into the reduction-causing agent supply passage; and gas discharge process of supplying the reduction-causing agent to compress the exhaust gas inside the reduction-causing agent supply passage, discharging the compressed exhaust gas from the injection nozzle, and closing a valve of the injection nozzle before the reduction-causing agent reaches the injection nozzle.

11 Claims, 17 Drawing Sheets

(51) Int. Cl.
  *F01N 3/20* (2006.01)
  *F02B 37/12* (2006.01)
  *F02D 41/02* (2006.01)
  *F02D 41/04* (2006.01)

(52) U.S. Cl.
  CPC ....... *F02D 41/0275* (2013.01); *F02D 41/042* (2013.01); *F01N 2550/05* (2013.01); *F01N 2610/02* (2013.01); *F01N 2610/144* (2013.01); *F01N 2610/1493* (2013.01); *F01N 2900/08* (2013.01); *F01N 2900/1808* (2013.01); *F01N 2900/1818* (2013.01); *F01N 2900/1822* (2013.01); *Y02T 10/144* (2013.01); *Y02T 10/24* (2013.01)

(58) Field of Classification Search
  CPC ....... F01N 2610/144; F01N 2610/1493; F01N 2900/08; F01N 2900/1808; F01N 2900/1818; F01N 2900/1822; F02B 37/12; F02D 41/0275; F02D 41/042; Y02T 10/144
  See application file for complete search history.

(56) References Cited

FOREIGN PATENT DOCUMENTS

| JP | 2012-137041 | | 7/2012 |
| JP | 2014-218973 | | 11/2014 |
| JP | 2014218973 | A * | 11/2014 |
| WO | WO 2014-038084 | | 3/2014 |
| WO | WO 2014-061377 | | 4/2014 |

OTHER PUBLICATIONS

International Preliminary Report on Patentability for International Application No. PCT/JP2014/082821, dated Jun. 13, 2017, 11 pages, with English translation.

International Search Report and Written Opinion for International Application No. PCT/JP2014/082821, dated Mar. 17, 2015, 13 pages, with English translation.

* cited by examiner

REDUCING AGENT SUPPLY DEVICE AND METHOD FOR CONTROLLING REDUCING AGENT SUPPLY DEVICE

CROSS-REFERENCE TO RELATED APPLICATIONS

This application claims priority to International Application No. PCT/JP2014/082821 filed on Dec. 11, 2014, the contents of which are incorporated herein in their entirety.

TECHNICAL FIELD

The present invention relates to a reduction-causing agent supply device and a method of controlling the reduction-causing agent supply device.

BACKGROUND ART

A construction machine such as a hydraulic excavator and a wheel loader, a delivery vehicle such as a bus, cargo truck, dump truck and on-road truck, and a vehicle and a machine including a diesel engine (e.g., a stationary generator) and the like include a Selective Catalytic Reduction (hereinafter, referred to as "SCR") system using a urea solution in a form of a device configured to control, within a regulatory value, nitrogen oxides (NOx) that are one of restricted substances contained in an exhaust gas discharged from an engine.

This urea SCR system includes: a tank configured to store a urea solution as a reduction-causing agent; a squeeze pump configured to pump the reduction-causing agent drawn from the tank; a reduction-causing agent supply passage through which the pumped reduction-causing agent is supplied; and a reduction-causing agent injection nozzle configured to supply the reduction-causing agent into an exhaust pipe from the reduction-causing agent supply passage.

An injector of the urea solution in the urea SCR system is exemplified by an air assist injector using a compressed air and an airless injector without using a compressed air. In order to raise a pressure of the urea solution, the airless injector includes a valve for opening and closing an aperture of a nozzle. With this arrangement, an injected amount of the urea solution can be controlled with a high accuracy by controlling a time and a frequency of opening and closing the valve.

In the urea SCR system, when a solvent (water) of the urea solution remaining inside the reduction-causing agent injection nozzle is evaporated after the engine is stopped, urea is crystallized. This causes a poor operation of an injection valve and a clogged injection hole, resulting in a faulty injection of the urea solution. Further, since a volume of the urea solution is increased when the urea solution freezes at a low temperature, a device such as the injection valve is likely to be broken.

In order to solve this problem, there has been known a reduction-causing agent supply device for preventing the urea solution from being solidified, the reduction-causing agent supply device including the squeeze pump configured to further supply the urea solution to the reduction-causing agent supply passage and the reduction-causing agent injection nozzle after the engine is stopped, and subsequently draw back and collect the urea solution, thereby collecting heat of the reduction-causing agent injection nozzle, so that the urea solution remaining in the injection nozzle is avoided from being heated (see, for instance, Patent Literature 1).

CITATION LIST

Patent Literature(s)

Patent Literature 1: JP-A-2012-137041

SUMMARY OF THE INVENTION

Problems to be Solved by the Invention

Since a passage in the injection nozzle has a particularly complicated shape, even when the urea solution supplied in the injection nozzle is attempted to be drawn back, it is difficult to completely collect the urea solution, so that the urea solution remains in the injection nozzle.

When the injection nozzle is left with the urea solution remaining inside, water is evaporated to deposit urea as described above, thereby blocking the passage inside the injection nozzle and impeding movement of the valve. Accordingly, when the operation of the engine is restarted, the injection nozzle is unable to inject the urea solution.

An object of the invention is to provide a reduction-causing agent supply device capable of prohibiting a reduction-causing agent from remaining in an injection nozzle and a control method of the reduction-causing agent supply device.

Means for Solving the Problems

According to an aspect of the invention, a reduction-causing agent supply device includes: a tank configured to store a reduction-causing agent to be supplied into an exhaust pipe of an engine; a pumping unit configured to pump the reduction-causing agent stored in the tank; a reduction-causing agent supply passage configured to supply the pumped reduction-causing agent; an injection nozzle configured to inject the reduction-causing agent supplied through the reduction-causing agent supply passage into the exhaust pipe; a drawing-back unit configured to draw back the reduction-causing agent present inside the reduction-causing agent supply passage toward the tank; and a controller configured to control an operation of each of the pumping unit, the injection nozzle and the drawing-back unit, in which the controller is configured to perform a reduction-causing agent drawing-back process and a compressed gas discharge process, after the engine is stopped, where, in the reduction-causing agent drawing-back process; the controller is configured to operate the drawing-back unit, while a valve of the injection nozzle is closed, to draw back the reduction-causing agent present inside the reduction-causing agent supply passage toward the tank; and operate the drawing-back unit, while the valve of the injection nozzle is open, to introduce gas present inside the exhaust pipe into the injection nozzle and the reduction-causing agent supply passage, in the compressed gas discharge process; the controller is configured to operate the pumping unit, while the valve of the injection nozzle is closed, to supply the reduction-causing agent into the reduction-causing agent supply passage to compress the gas introduced in the reduction-causing agent supply passage; open the valve of the injection nozzle to discharge the compressed gas into the exhaust pipe through the injection nozzle; and close the valve of the injection nozzle before the reduction-causing agent present inside the reduction-causing agent supply passage reaches the injection nozzle.

According to the above aspect of the invention, after the engine is stopped, since the drawing-back unit is operated while the valve of the injection nozzle is closed, the reduction-causing agent present inside the injection nozzle and the reduction-causing agent supply passage can be drawn back toward the tank.

Next, the drawing-back unit is operated while the valve of the injection nozzle is open to introduce the gas present inside the exhaust pipe into the injection nozzle and the reduction-causing agent supply passage. Subsequently, the valve of the injection nozzle is closed and the reduction-causing agent is supplied by the pumping unit into the reduction-causing agent supply passage. Accordingly, the gas introduced in the reduction-causing agent supply passage is trapped between the injection nozzle and the reduction-causing agent supplied in the reduction-causing agent supply passage, and is compressed as the reduction-causing agent is pumped.

Subsequently, when the valve of the injection nozzle is opened, the compressed gas is discharged into the exhaust pipe through the injection nozzle. A pressure applied to the injection nozzle by the compressed gas can be easily made higher as compared with when the reduction-causing agent present inside the injection nozzle is drawn back by the drawing-back unit. For this reason, even when the reduction-causing agent remains inside the injection nozzle after the reduction-causing agent is drawn back, the remaining reduction-causing agent can be blown by the discharged compressed gas to be removed.

Accordingly, the reduction-causing agent can be prohibited from remaining in the injection nozzle and the remaining reduction-causing agent can be prevented from being crystallized. Consequently, the passage of the injection nozzle can be prevented from being blocked by the crystallized reduction-causing agent and the movement of the valve can be prevented from being impeded. When the operation of the engine is restarted, the reduction-causing agent can be reliably injected into the exhaust pipe.

Further, after discharging the compressed gas, since the controller closes the valve of the injection nozzle before the reduction-causing agent present inside the reduction-causing agent supply passage reaches the injection nozzle, the reduction-causing agent can be prevented from again reaching the injection nozzle. Accordingly, the amount of the reduction-causing agent remaining inside the injection nozzle is not increased. Even when the remaining reduction-causing agent is not completely removed by the compressed gas discharge process for the first time, the reduction-causing agent remaining inside the injection nozzle can be reliably removed by repeating the compressed gas discharge process for a plurality of times.

In the above arrangement, preferably, in the reduction-causing agent drawing-back process; the controller is configured to operate the drawing-back unit, while the valve of the injection nozzle is closed, to draw back the reduction-causing agent present inside the reduction-causing agent supply passage toward the tank; at an elapse of a predetermined first set time after the drawing-back unit starts to be operated, open the valve of the injection nozzle to introduce the gas present inside the exhaust pipe into the injection nozzle and the reduction-causing agent supply passage; at an elapse of a predetermined second set time after the drawing-back unit starts to be operated, stop the drawing-back unit; and at an elapse of a predetermined third set time after the drawing-back unit starts to be operated, close the valve of the injection nozzle, and in the compressed gas discharge process; the controller is configured to operate the pumping unit, while the valve of the injection nozzle is closed, to supply the reduction-causing agent into the reduction-causing agent supply passage to compress the gas introduced in the reduction-causing agent supply passage; at an elapse of a predetermined fourth set time after the pumping unit starts to be operated, open the valve of the injection nozzle to discharge the compressed gas into the exhaust pipe through the injection nozzle, and at an elapse of a predetermined fifth set time after the pumping unit starts to be operated, close the valve of the injection nozzle.

In the above arrangement, preferably, the reduction-causing agent supply device further includes: a pressure gauge configured to measure a pressure in the reduction-causing agent supply passage, where, in the reduction-causing agent drawing-back process, the controller is configured to operate the drawing-back unit, while the valve of the injection nozzle is closed, to draw back the reduction-causing agent present inside the reduction-causing agent supply passage toward the tank; when a value measured by the pressure gauge reaches a predetermined first pressure value after the drawing-back unit starts to be operated, open the valve of the injection nozzle to introduce the gas present inside the exhaust pipe into the injection nozzle and the reduction-causing agent supply passage; when the value measured by the pressure gauge reaches a predetermined second pressure value higher than the first pressure value, stop the drawing-back unit; and when the value measured by the pressure gauge reaches a predetermined third pressure value higher than the second pressure value, close the valve of the injection nozzle, and in the compressed gas discharge process; the controller is configured to operate the pumping unit, while the valve of the injection nozzle is closed, to supply the reduction-causing agent into the reduction-causing agent supply passage to compress the gas introduced in the reduction-causing agent supply passage; when the value measured by the pressure gauge reaches a predetermined fourth pressure value higher than the third pressure value, open the valve of the injection nozzle to discharge the compressed gas into the exhaust pipe through the injection nozzle, and when the value measured by the pressure gauge reaches a predetermined fifth pressure value higher than the third pressure value and lower than the fourth pressure value, close the valve of the injection nozzle.

In the above arrangement, preferably, the first pressure value, the second pressure value, the third pressure value, the fourth pressure value and the fifth pressure value are values calculated based on an inner diameter and a length of the reduction-causing agent supply passage, a volume of each of the pumping unit and the drawing-back unit, and a volume of the injection nozzle.

In the above arrangement, preferably, after the engine is stopped, the controller is configured to repeat the reduction-causing agent drawing-back process and the compressed gas discharge process for a plurality of times and subsequently perform the reduction-causing agent drawing-back process.

According to another aspect of the invention, in a control method of a reduction-causing agent supply device including: a tank configured to store a reduction-causing agent to be supplied into an exhaust pipe of an engine; a pumping unit configured to pump the reduction-causing agent stored in the tank; a reduction-causing agent supply passage configured to supply the pumped reduction-causing agent; an injection nozzle configured to inject the reduction-causing agent supplied through the reduction-causing agent supply passage into the exhaust pipe; a drawing-back unit configured to draw back the reduction-causing agent present inside the reduction-causing agent supply passage toward the tank, the control method includes: after the engine is stopped, operating the drawing-back unit, while a valve of the injection nozzle is closed, to draw back the reduction-causing agent present inside the reduction-causing agent supply passage toward the tank; operating the drawing-back unit, while the valve of the injection nozzle is open, to introduce gas present inside the exhaust pipe into the injection nozzle and the reduction-causing agent supply passage; operating the pumping unit, while the valve of the injection nozzle is closed, to supply the reduction-causing agent into the reduction-causing agent supply passage to compress the gas introduced in the reduction-causing agent supply passage; opening the valve of the injection nozzle to discharge the compressed gas into the exhaust pipe through the injection nozzle, and closing the valve of the injection nozzle before the reduction-causing agent present inside the reduction-causing agent supply passage reaches the injection nozzle.

Also in the above aspect of the invention, the same advantages as those of the reduction-causing agent supply device can be achieved.

DESCRIPTION OF EMBODIMENT(S)

Exemplary embodiment(s) of the invention will be described below with reference to the attached drawings.

First Exemplary Embodiment

Overall Structure of Exhaust Gas Aftertreatment Device

Figure 1:
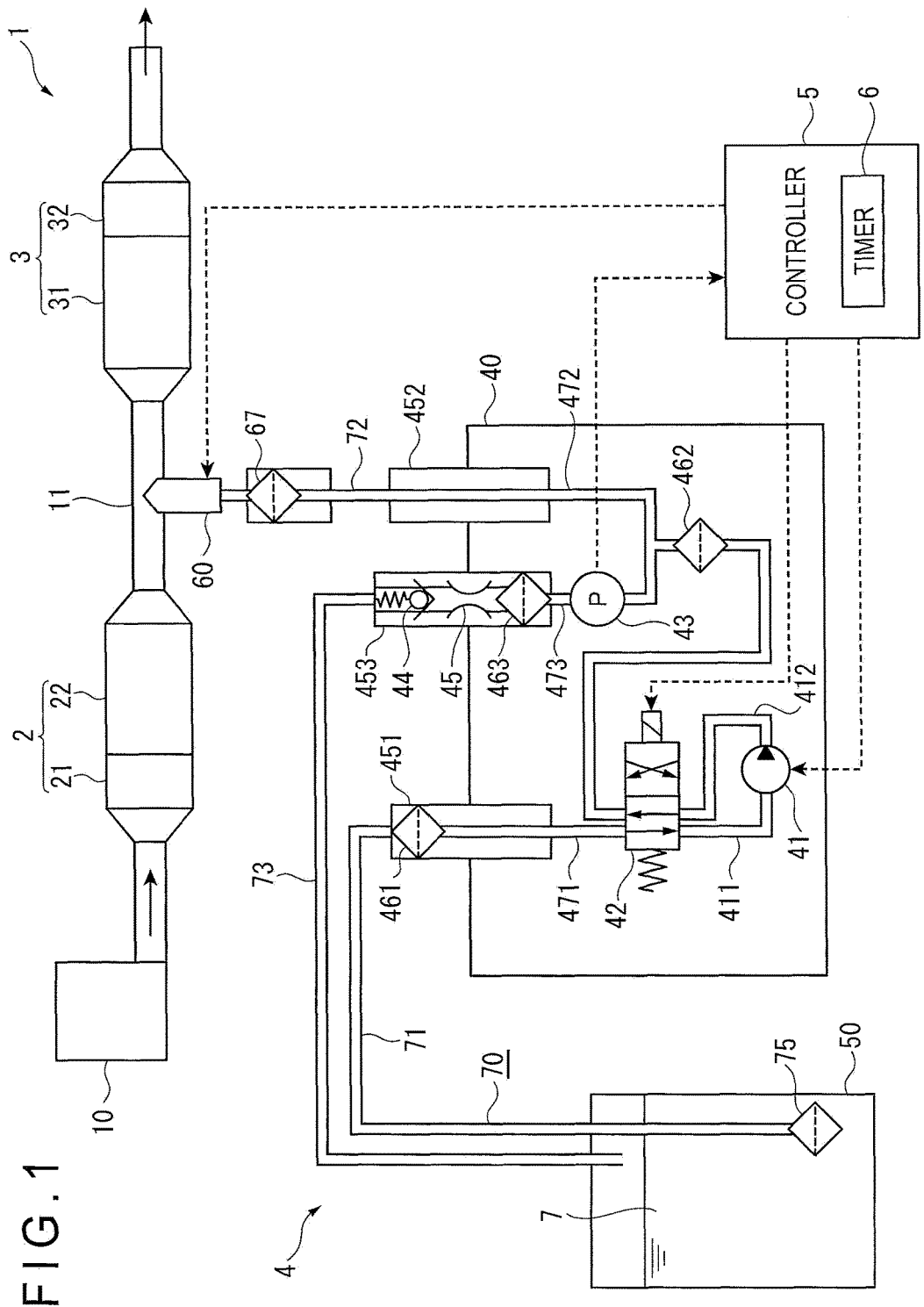
FIG. 1 illustrates a structure of an exhaust aftertreatment device including a reduction-causing agent supply device according to a first exemplary embodiment of the invention.

FIG. 1 illustrates an overall structure of an exhaust aftertreatment device 1 including a reduction-causing agent supply device 4 in a first exemplary embodiment. The exhaust gas aftertreatment device 1 purifies an exhaust gas by conducting processes such as collection and reduction of residual substances such as Particulate Matters (hereinafter, referred to as "PM") and nitrogen oxides (NOx) present in an exhaust gas flowing in an exhaust pipe 11 of a diesel engine (hereinafter, referred to as "engine") 10. The exhaust gas aftertreatment device 1 includes: a Diesel Particulate Filter (hereinafter, referred to as "DPF") device 2; a Selective Catalytic Reduction (hereinafter, referred to as "SCR") device 3; a reduction-causing agent supply device 4; and a controller 5.

DPF Device

The DPF device 2 includes: a Diesel Oxidation Catalyst (hereinafter, referred to as "DOC") 21; and a Catalyzed Soot Filter (hereinafter, referred to as "CSF") 22.

The DOC 21 is a catalyst to oxidize a dosing fuel supplied into the exhaust gas as needed to generate heat, thereby raising a temperature of the exhaust gas to a predetermined high temperature range. Using the temperature-raised exhaust gas, the PM accumulated in the later-described CSF 22 is burned by itself and removed to regenerate the CSF 22.

When an internal combustion engine is in a form of a diesel engine, for instance, the dosing fuel is light oil that is the same as the engine fuel. The dosing fuel is supplied into the exhaust gas using a dosing-fuel injector (not shown) provided to the exhaust pipe 11 and is flowed along with the exhaust gas into the DPF device 2. When supplying the dosing fuel into an engine cylinder, the dosing fuel is supplied using a fuel injector configured to inject the dosing fuel into the engine cylinder.

The CSF 22 (not specifically shown) is a filter having a great number of pores and configured to collect the PM in the exhaust gas. The pores of the CSF 22 penetrate the CSF 22 from an inlet side to an outlet side. A cross section of each of the pores is formed polygonal (e.g., hexagonal cross section). In the pores, first pores each having an open inlet and a closed outlet and second pores each having a closed inlet and an open outlet are alternately disposed. The exhaust gas flowed from the first pores passes through a boundary wall to reach the second pores, so that the exhaust gas is discharged toward a downstream side. The PM is collected by the boundary wall.

A material of the CSF 22 is ceramics such as cordierite and silicon carbide or metal such as stainless steel and aluminum, and is appropriately determined depending on usage. The inlet side of the CSF 22 may be coated, for instance, by a wash coating with an oxidation catalyst made of a material different from the DOC 21.

SCR Device

The SCR device 3 includes an SCR 31 and an ammonia oxidation catalyst 32.

The SCR 31 reduces and purifies nitrogen oxides ($NO_x$) in the exhaust gas using as the reducing agent ammonia obtained by pyrolysis of the urea solution injected into the exhaust gas from the reduction-causing agent supply device 4.

The ammonia oxidation catalyst 32 disposed on the downstream side of the SCR 31 oxidizes the ammonia unused in the SCR 31 to turn the ammonia into a harmless substance, thereby further reducing a harmful component in the exhaust gas.

The SCR device 3 is provided with various sensors (not shown) such as a temperature sensor configured to measure an inlet temperature of the SCR device 3, a temperature sensor configured to measure an outlet temperature of the SCR device 3, and an ammonia sensor configured to measure a concentration of the ammonia.

Measurement data of the sensors is outputted to the controller 5. The controller 5 controls the reduction-causing agent supply device 4 based on the measurement data to control an injection of the urea solution and the like.

Reduction-Causing Agent Supply Device

The reduction-causing agent supply device 4 is configured to inject the urea solution 7 (i.e., a reduction-causing agent aqueous solution) into the exhaust gas. The reduction-causing agent supply device 4 includes: a pump unit 40 configured to pump the urea solution 7; a tank 50 in which the urea solution 7 is stored; an injection nozzle 60 configured to inject the urea solution 7 into the exhaust pipe 11; and a reduction-causing agent supply passage 70 through which the urea solution 7 is supplied by the pump unit 40 from the tank 50 to the injection nozzle 60.

Pump Unit

The pump unit 40 includes: a pump 41 configured to pump the urea solution 7; a switching valve 42; a pressure gauge 43; a check valve 44; and an orifice 45. The pump unit 40 further includes three ports 451, 452, 453.

The port 451 is an inlet port of the pump unit 40 and is connected to the switching valve 42 by a first passage 471. The port 452 is an outlet port of the pump unit 40 and is connected to the switching valve 42 by a second passage 472. The port 453 is a return port for returning the urea solution 7 to the tank 50 and is connected to a third passage 473 branched from the second passage 472.

A screen filter 461 for an inlet of the pump is provided to the port 451 and prevents foreign substances from entering the pump 41. A filter 462 is provided in the course of the second passage 472 and prevents foreign substances from flowing out.

The port 453 includes a screen filter 463, the check valve 44, and the orifice 45. A pressure gauge 43 is disposed in the third passage 473. Since the third passage 473 intercommunicates with the second passage 472, the pressure gauge 43 detects an in-system pressure P of the second passage 472 and a second reduction-causing agent supply passage 72.

Reduction-Causing Agent Supply Passage

The tank 50 is connected to the port 451 by a first reduction-causing agent supply passage 71. The port 452 is connected to the injection nozzle 60 by the second reduction-causing agent supply passage 72. Thus, the first reduction-causing agent supply passage 71 and the second reduction-causing agent supply passage 72 defines the reduction-causing agent supply passage 70 through which the urea solution 7 (i.e., reduction-causing agent) is supplied from the tank 50 to the injection nozzle 60.

The port 453 is connected to the tank 50 by a bypass line 73.

The first reduction-causing agent supply passage 71, the second reduction-causing agent supply passage 72, and the bypass line 73 are specifically hoses.

An end of the first reduction-causing agent supply passage 71 in the tank 50 is disposed close to a bottom of the tank 50 so that the urea solution 7 can be drawn from the tank 50. Moreover, a tank suction strainer 75 is provided to the end of the first reduction-causing agent supply passage 71 and prevents foreign substances from being drawn into the reduction-causing agent supply passage 70.

An end of the bypass line 73 in the tank 50 is disposed at a position higher than a liquid surface of the urea solution 7 in the tank 50.

Further, a breather and the like for keeping an internal pressure at an atmospheric pressure are provided to the tank 50.

Pump

The pump 41 is typified by an electric pump. The controller 5 controls drive of the pump 41. An inlet passage 411 and an outlet passage 412 of the pump 41 are connected to the switching valve 42.

Switching Valve

The switching valve 42 is an electromagnetic switching valve configured to switch a flowing direction of the urea solution 7 pumped by the pump 41 between a forward direction in which the urea solution 7 flows from the tank 50 to the injection nozzle 60 and a backward direction in which the urea solution 7 flows from the injection nozzle 60 to the tank 50, in response to a control signal from the controller 5.

When the control signal is not outputted from the controller 5 and electricity is turned off to a solenoid, the switching valve 42 brings the first passage 471 into communication with the inlet passage 411 and brings the second passage 472 into communication with the outlet passage 412 to set the flowing direction of the urea solution 7 to the forward direction. When the pump 41 is operated in this state, the urea solution 7 is drawn from the first reduction-causing agent supply passage 71 through the first passage 471 into the inlet passage 411 and is discharged from the outlet passage 412 through the second passage 472 to the second reduction-causing agent supply passage 72. Thus, the pump 41 and the switching valve 42 setting the flowing direction of the urea solution 7 to the forward direction define a pumping unit of the invention.

On the other hand, when the control signal is outputted from the controller 5 and electricity is turned on to the solenoid, the switching valve 42 brings the first passage 471 into communication with the outlet passage 412 and brings the second passage 472 into communication with the inlet passage 411 to set the flowing direction of the urea solution 7 to the backward direction. When the pump 41 is operated in this state, the urea solution 7 is drawn from the second reduction-causing agent supply passage 72 through the second passage 472 into the inlet passage 411 and is discharged from the outlet passage 412 through the first passage 471 and the first reduction-causing agent supply passage 71 to the tank 50. Thus, the pump 41 and the switching valve 42 setting the flowing direction of the urea solution 7 to the backward direction define a drawing-back unit of the invention.

It should be noted that an arrangement for switching the flowing direction of the urea solution 7 is not limited to the arrangement using the switching valve 42 according to the exemplary embodiment. For instance, two pumps may be provided and a first one of the pumps may discharge the urea solution 7 while a second one thereof may draw back the urea solution 7. In this arrangement, it is only required that a discharging pump is operated and a drawing-back pump is stopped to discharge the urea solution 7 in the forward direction and the discharging pump is stopped and the drawing-back pump is operated to draw back the urea solution 7 in the backward direction.

Injection Nozzle

Figure 2:
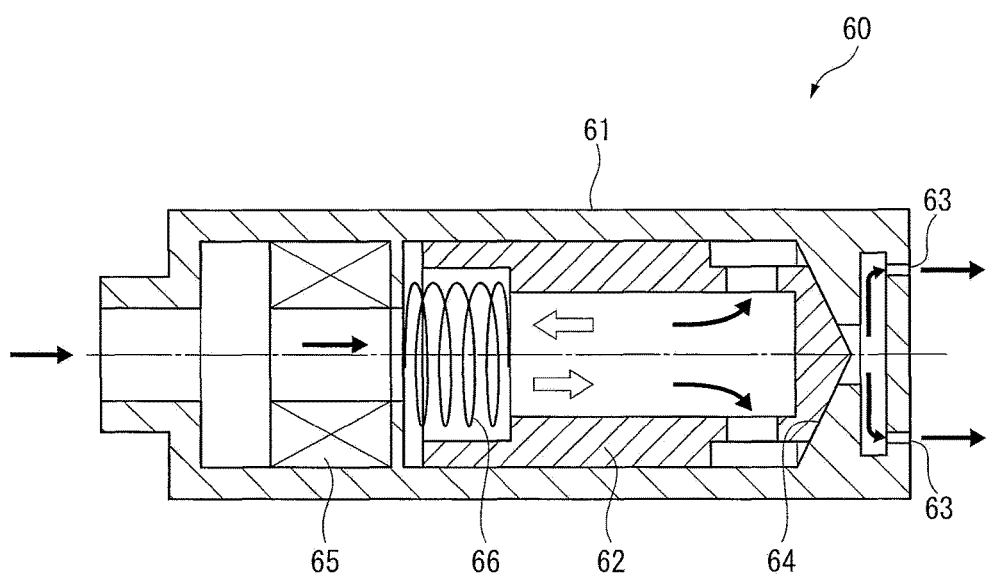
FIG. 2 illustrates a structure of an injection nozzle of the reduction-causing agent supply device.

As shown in FIG. 2, the injection nozzle 60 includes a case 61, a needle valve 62, an injection hole 63, a valve seat 64, an electromagnet 65 and a spring 66, the needle valve 62 being advanced and retracted with respect to the valve seat 64 in communication with the injection hole 63 to control opening and closing the valve of the injection nozzle 60. Specifically, when the control signal is outputted from the controller 5 to turn on electricity to the electromagnet 65, the needle valve 62 is separated from the valve seat 64 by a magnetic force generating on the electromagnet 65, so that the injection nozzle 60 is brought into the valve open state in which the urea solution 7 is injectable from the injection hole 63. On the other hand, when the control signal is not outputted form the controller 5 and electricity is turned off to the electromagnet 65, the needle valve 62 is brought into contact with the valve seat 64 by the spring 66 and a pressure of the urea solution 7, so that the injection nozzle 60 is brought into the valve closed state in which the urea solution is not injectable from the injection hole 63.

The urea solution 7 injected from the injection hole 63 into the exhaust pipe 11 in the valve open state of the injection nozzle 60 is pyrolyzed by heat of the exhaust gas to form ammonia. The ammonia reduces and purifies nitrogen oxides in the SCR 31.

A screen filter 67 is provided between the injection nozzle 60 and the second reduction-causing agent supply passage 72 as shown in FIG. 1.

Controller

The controller 5 is in a form of a microcomputer and configured to read a detection signal of the pressure gauge 43 and sensor signals of the pressure sensors and the temperature sensors provided to the DPF device 2 and the SCR device 3.

Further, the controller 5 is configured to read various sensor signals of an engine speed sensor configured to detect an engine speed of the engine 10, an accelerator sensor configured to detect an operation amount of an accelerator pedal, and a brake sensor configured to detect an operation amount of a brake pedal.

Moreover, the controller 5 includes a RAM (Random Access Memory) (not shown) configured to store a calculation result and a detection result in each of the components.

Further, the controller 5 includes a built-in timer 6 configured to measure a time.

The controller 5 outputs the control signal to each of the pump 41, the switching valve 42 and the injection nozzle 60 to control operations thereof.

In other words, the controller 5 provides a feedback control to the pump 41 based on a pressure value detected by the pressure gauge 43 during an operation of the engine 10, thereby maintaining an internal pressure of the second passage 472 and the second reduction-causing agent supply passage 72 at a predetermined value. Specifically, when the pressure value detected by the pressure gauge 43 with respect to the urea solution 7 pumped by the pump 41 is higher than the predetermined value, the controller 5 decreases a discharge rate of the pump 41. When the pressure value is lower than the predetermined value, the controller 5 increases the discharge rate of the pump 41. Thus, the controller 5 maintains the internal pressure of the second passage 472 and the second reduction-causing agent supply passage 72 at the predetermined value.

Moreover, the controller 5 controls driving of the injection nozzle 60 based on the engine speed of the engine 10, a sensor value of a NOx sensor provided on the downstream side of the exhaust gas of the SCR 31, and the like.

Further, the controller 5 commands to perform a process of removing the urea solution 7 from the injection nozzle 60 when the engine 10 is stopped. At this time, as described later, the controller 5 operates the pump 41, the switching valve 42 and the injection nozzle 60 at a predetermined timing to remove the urea solution 7 from the injection nozzle 60.

Control Method of Reduction-Causing Agent Supply Device

Next, a control method of the reduction-causing agent supply device 4 by the controller 5 will be described with reference to the flowcharts of FIGS. 3 to 5 and the illustrations describing the operations of FIGS. 6 to 10.

Figure 3:
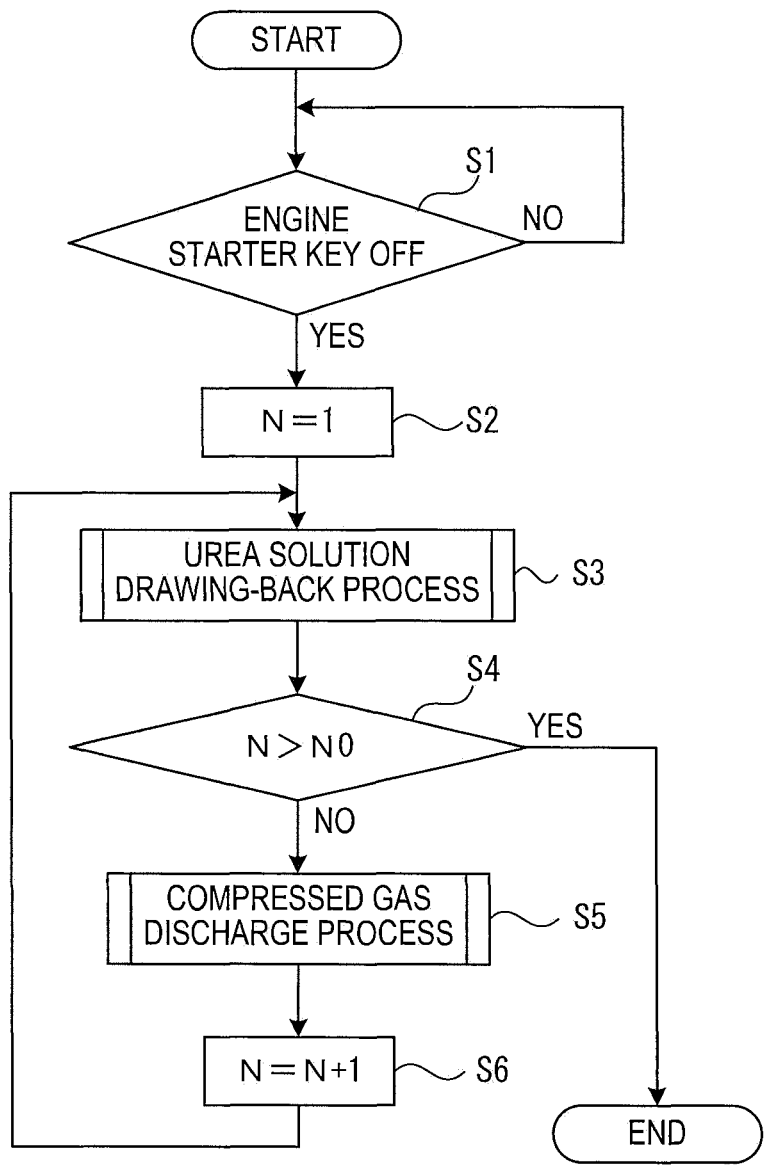
FIG. 3 is a flowchart describing a control method of the reduction-causing agent supply device in the first exemplary embodiment.
Figure 4:
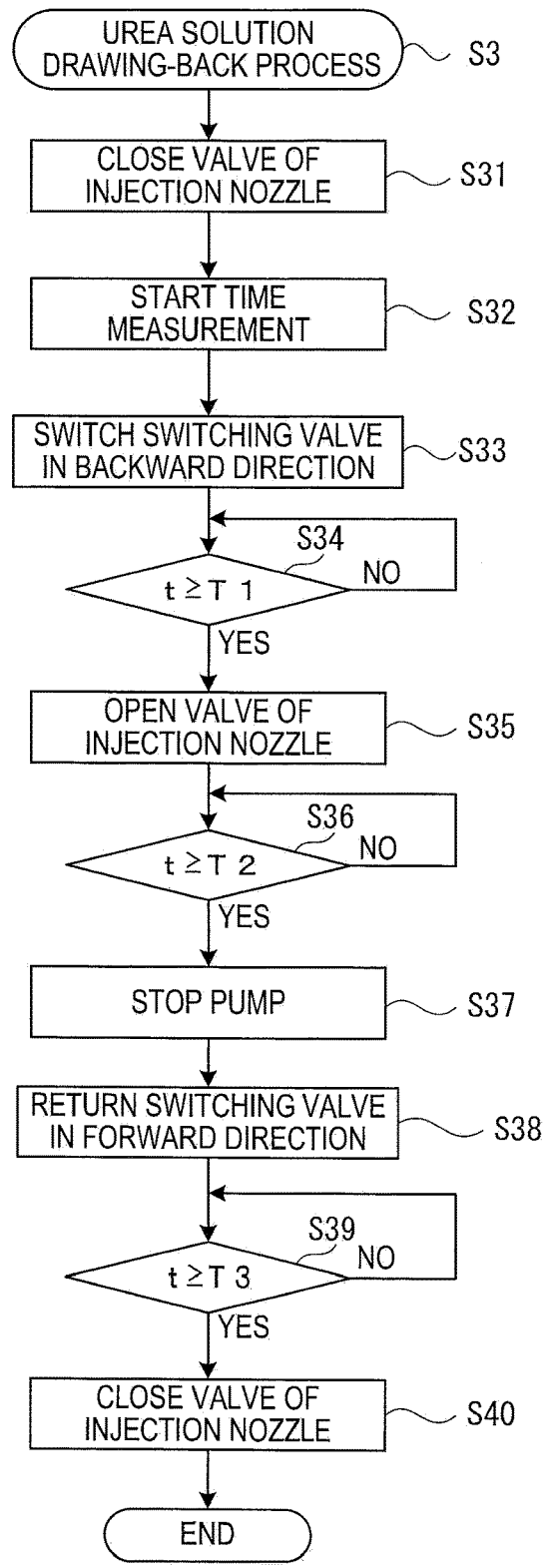
FIG. 4 is a flowchart describing a urea solution drawing-back process.

As shown in FIG. 3, while the engine 10 is in operation, the controller 5 judges whether or not an engine starter key is turned OFF (Step S1). When the controller 5 judges NO at Step S1, since the engine 10 is in operation, the controller 5 operates the reduction-causing agent supply device 4 to keep injecting the urea solution 7 into the exhaust pipe 11.

Figure 6:
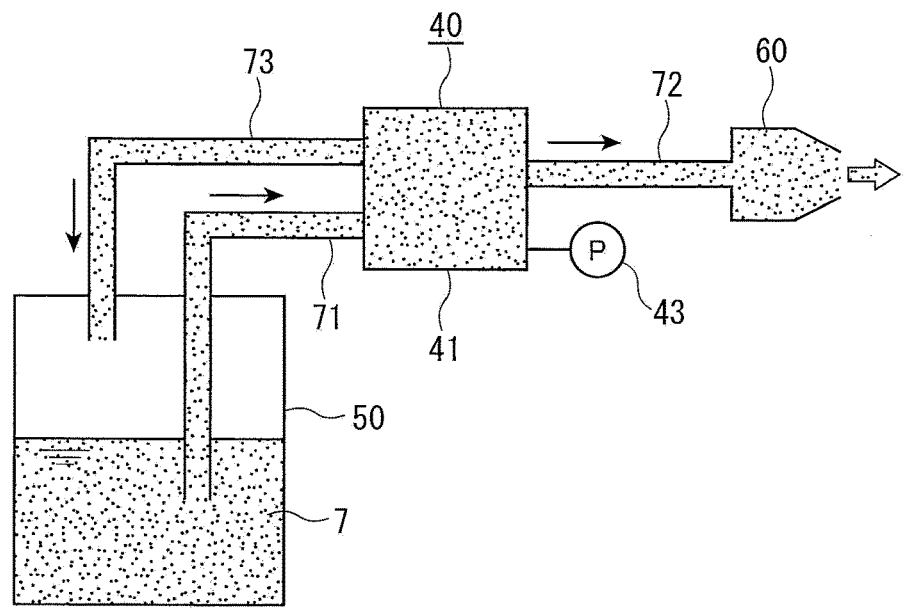
FIG. 6 is an illustration for describing an operation in the urea solution drawing-back process.

Specifically, while the engine 10 is in operation, as shown in FIG. 6, the controller 5 controls the pump 41 in the pump unit 40 based on the pressure value detected by the pressure gauge 43 to pump the urea solution 7 stored in the tank 50 toward the injection nozzle 60. A part of the urea solution 7 is returned into the tank 50 through the bypass line 73, so that the internal pressure of the second reduction-causing agent supply passage 72 is maintained at the predetermined value.

Moreover, the controller 5 controls a time and a frequency of opening the valve of the injection nozzle 60 based on the measurement values of the temperature sensor, the ammonia sensor and the like provided to the SCR device 3, thereby controlling the injection of the urea solution 7 into the exhaust pipe 11.

When an operator turns the starter key of the engine 10 OFF, as shown in FIG. 3, the controller 5 judges YES at Step S1 and performs a removal process of a residual urea solution present inside the injection nozzle 60 at and after Step S2. At this time, the controller 5 continues to drive the pump 41 even after the engine 10 is stopped when the controller 5 judges YES at Step S1.

Since the timing for stopping the engine 10 depends on the operations by the operator, the engine stop occurs when the urea solution 7 is being injected since the valve of the injection nozzle 60 is opened just before the engine 10 is stopped and when the urea solution 7 is not injected since the value of the injection nozzle 60 is closed.

Judging YES at Step S1, the controller 5 sets a variable N representing a process frequency to an initial value "1" (Step S2).

Next, the controller 5 performs a urea solution drawing-back process described later (Step S3). Subsequently, the controller 5 judges whether or not the variable N is larger than a predetermined set value N0 (Step S4). The set value N0 is a set value for execution frequency of a compressed gas discharge process S5 as described later.

Judging NO at Step S4, the controller 5 performs the later-described compressed gas discharge process (Step S5) and increments the variable N by 1 (Step S6).

Subsequent to Step S6, the controller 5 again performs the urea solution drawing-back process S3. Subsequently, the controller 5 repeatedly performs the processes of Steps S5, S6 and S3 until the controller 5 judges YES at Step S4.

When the controller 5 judges YES at Step S4, in other words, after the controller 5 performs the compressed gas discharge process S5 at the frequency represented by the set value N0, the controller 5 finishes controlling the reduction-causing agent supply device 4 during the stop of the engine. When the controller 5 finishes controlling after repeating Steps S3 to S6, since the urea solution drawing-back process S3 is performed at the beginning and at the end, the frequency of the urea solution drawing-back process S3 to be performed is larger by one than that of the compressed gas discharge process S5.

Urea Solution Drawing-Back Treatment

Next, the urea solution drawing-back process S3 will be described in detail with reference to the flowchart in FIG. 4, the illustrations describing the operations in FIGS. 6 to 10, and the graph showing a pressure change in FIG. 11.

Until the controller 5 judges YES at Step S1, the controller 5 controls the pump 41 based on the in-system pressure P detected by the pressure gauge 43 as described above so that the in-system pressure P of the second passage 472 and the second reduction-causing agent supply passage 72, which is detected by the pressure gauge 43, is maintained at a predetermined positive pressure (predetermined value).

Then, as described above, after performing the urea solution drawing-back process S3, the controller 5 closes the valve of the injection nozzle 60 (Step S31).

Although the valve of the injection nozzle 60 may have been closed depending on the timing for turning the engine starter key OFF as described above, the valve closed state is maintained in such a case. Specifically, when the injection nozzle 60 is in the valve open state where electricity is turned on to the electromagnet 65, the controller 5 turns off electricity to the electromagnet 65 at Step S31 to close the valve. When the injection nozzle 60 is in the valve closed state where electricity is turned off to the electromagnet 65, the controller 5 keeps the electromagnet 65 as electricity is turned off (i.e., the valve closed state) even at Step S31. Before performing Step S31, the controller 5 may judge whether the injection nozzle 60 is in the valve open state or in the valve closed state, and perform a process of closing the valve of the injection nozzle 60 only when the injection nozzle 60 is in the valve open state.

Next, the controller 5 starts measuring the time using the timer 6 (Step S32). Given that a measurement time by the timer 6 is represented by t, the controller 5 initializes t at zero at Step S32 and subsequently measures the time t using the built-in timer 6.

Next, the controller 5 turns on electricity to the solenoid of the switching valve 42 to switch the switching valve 42 to the backward flow direction (Step S33). At this time, since the operation of the pump 41 continues, the drawing-back unit starts to be operated at a timing when the switching valve 42 is switched to the backward flow direction. Moreover, since the time for the controller 5 to perform Steps S32 and S33 is very short, the time t measured by the timer 6 is substantially equal to the time t elapsed after the time T0 when the operation of the drawing-back unit is started after the switching valve 42 is switched to the backward flow direction.

Figure 7:
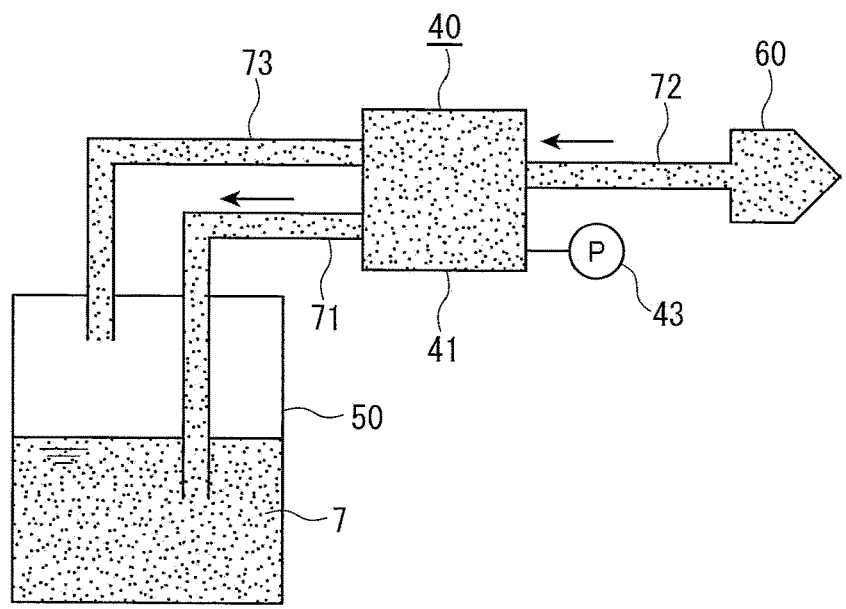
FIG. 7 is another illustration for describing the operation in the urea solution drawing-back process.

When the switching valve 42 is switched to the backward flow direction, as shown in FIG. 7, the urea solution 7 present inside the injection nozzle 60 and the second reduction-causing agent supply passage 72 is flowed backward and drawn toward the tank 50 through the first reduction-causing agent supply passage 71 by the operation of the pump 41 serving as the drawing-back unit. Accordingly, as shown in a period between the time T0 and the time T1 in FIG. 11, the in-system pressure P in the second reduction-causing agent supply passage 72 is gradually decreased. Moreover, since the bypass line 73 is blocked by the check valve 44 during the backward flow of the urea solution 7, the flow of the urea solution 7 is stopped in the bypass line 73.

When the operation of the pump 41 continues in this state, the backward flow of the urea solution 7 continues to some extent. However, since the injection nozzle 60 is in the valve closed state, when the pump 41 reaches a limit of a drawing capability of the pump 41 to cause a negative pressure, the backward flow of the urea solution 7 in the first reduction-causing agent supply passage 71 and the second reduction-causing agent supply passage 72 is stopped.

The controller 5 judges whether or not the time t (the time elapsed after the time T0) measured by the built-in timer 6 and starting from the time T0 is equal to or more than a predetermined first set time T1 (Step S34).

Herein, the first set time T1 is a time elapsed after the urea solution 7 present inside the second reduction-causing agent supply passage 72 starts to flow backward toward the tank 50 after the switching valve 42 is switched to the backward flow direction at Step S33 until the internal pressure of the second reduction-causing agent supply passage 72 reaches a predetermined negative pressure (i.e., a first pressure value P1). The first set time T1 is obtainable by an experiment in advance. Alternatively, the first set time T1 can be set based on a volume of the pump 41 and volumes of the second reduction-causing agent supply passage 72, the second passage 472 and the inlet passage 411 through which the urea solution 7 is flowed backward from the injection nozzle 60 to the pump 41.

When the measurement time t is less than the first set time T1 (i.e., in the case of NO at Step S34), the controller 5 keeps the pump 41 operating in the backward flow state while the valve of the injection nozzle 60 remains closed to continue the drawing-back operation of the urea solution 7.

Judging YES at Step S34, the controller 5 turns on electricity to the electromagnet 65 to open the valve of the injection nozzle 60 (Step S35).

Figure 8:
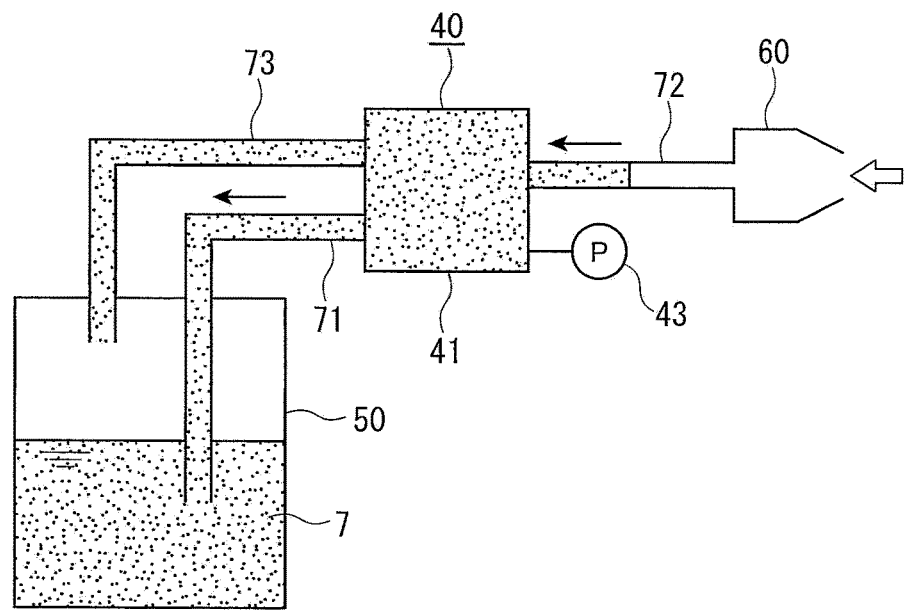
FIG. 8 is still another illustration for describing the operation in the urea solution drawing-back process.
Figure 9:
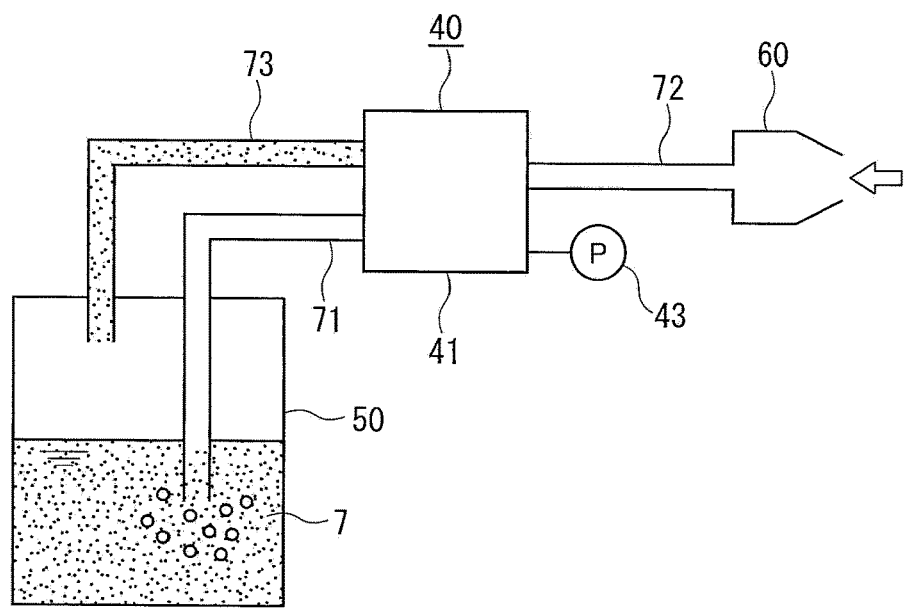
FIG. 9 is a further illustration for describing the operation in the urea solution drawing-back process.
Figure 11:
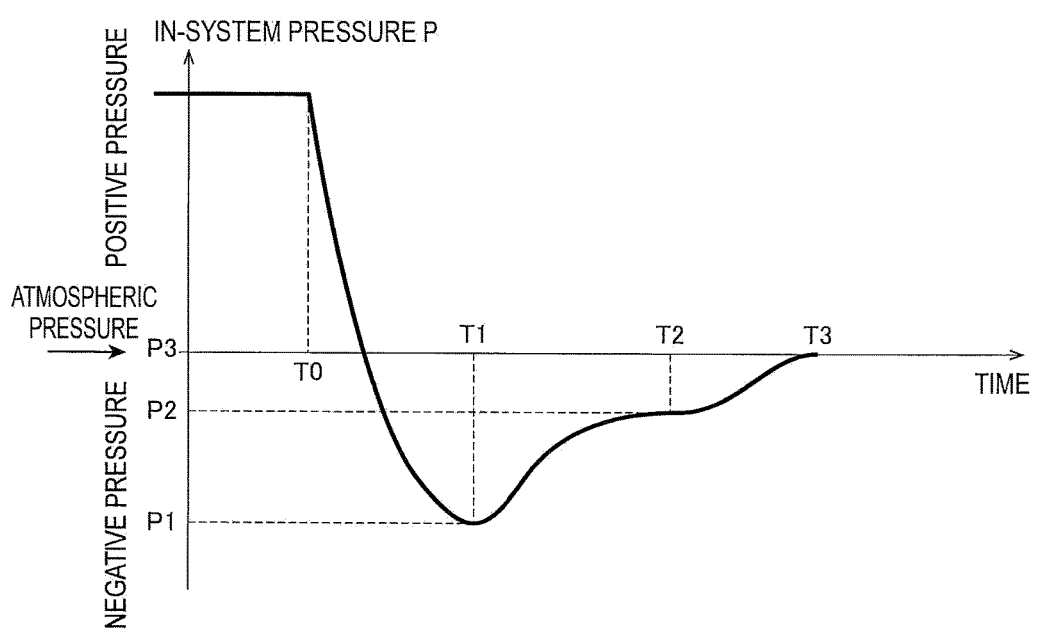
FIG. 11 is a graph showing a change in an in-system pressure during the operation in the urea solution drawing-back process.

Since the internal pressure of the second reduction-causing agent supply passage 72 is at a predetermined negative pressure P1 as shown in FIG. 11, when the valve of the injection nozzle 60 is opened, the urea solution 7 present inside the second reduction-causing agent supply passage 72 is drawn back toward the tank 50 as shown in FIG. 8, and gas flowing in the exhaust pipe 11 flows into the second reduction-causing agent supply passage 72 through the injection hole 63 of the injection nozzle 60. Accordingly, as shown in FIG. 11, the in-system pressure P in the second reduction-causing agent supply passage 72 is gradually increased.

Moreover, since the internal pressure of the second reduction-causing agent supply passage 72 is turned into the negative pressure at Steps S33 and S34 and subsequently the valve of the injection nozzle 60 is opened at Step S35, the urea solution 7 present inside the second reduction-causing agent supply passage 72 is prevented from being injected into the exhaust pipe 11 when the valve of the injection nozzle 60 is opened, and the gas in the exhaust pipe 11 can be reliably introduced into the injection nozzle 60 and the second reduction-causing agent supply passage 72.

The controller 5 judges whether or not the measurement time t started at Step S32 is equal to or more than a predetermined second set time T2 (Step S36).

Herein, the second set time T2 is a time elapsed from the time T0 until the reduction-causing agent supply passage 70 (the first reduction-causing agent supply passage 71 and the second reduction-causing agent supply passage 72) and the pump unit 40 (the second passage 472, the first passage 471, the inlet passage 411, and the outlet passage 412) are purged with the gas flowing from the injection nozzle 60.

The second set time T2 is also obtainable by an experiment in advance. Alternatively, the second set time T2 can be set based on the respective volumes of the reduction-causing agent supply passage 70 and the pump unit 40. In order to obtain the second set time T2, for instance, by an experiment, since the first reduction-causing agent supply passage 71 of the reduction-causing agent supply passage 70 is purged with the gas to generate air bubbles due to the gas in the urea solution 7 of the tank 50, the time t elapsed after the measurement starts until the air bubbles due to the gas are confirmed may be set as the second set time T2.

Since the reduction-causing agent supply device 4 is provided in various construction machinery, a length of a hose used as each of the first reduction-causing agent supply passage 71 and the second reduction-causing agent supply passage 72 may differ. In such a case, with the same diameter of the hose and the same pump unit 40, the second set time T2 can be easily set depending on the lengths of the hoses used as the first reduction-causing agent supply passage 71 and the second reduction-causing agent supply passage 72. In other words, when the lengths of the first reduction-causing agent supply passage 71 and the second reduction-causing agent supply passage 72 are lengthened, it is only required to increase the second set time T2.

When the measurement time t is less than the second set time T2 (i.e., in the case of NO at Step S36), the controller 5 keeps the pump 41 drawing the urea solution 7 while the valve of the injection nozzle 60 remains open.

Judging YES at Step S36, the controller 5 stops the pump 41 (Step S37). The in-system pressure P at this time is predetermined negative pressure (a second pressure value P2) as shown in FIG. 11. The second pressure value P2 is higher than the first pressure value P1.

Further, the controller 5 switches the switching valve 42 in a forward direction (Step S38). With this operation, the in-system pressure P in the second reduction-causing agent supply passage 72 gradually approaches the atmospheric pressure.

The controller 5 judges whether or not the elapsed time t is equal to or more than a predetermined third set time T3 (Step S39).

Herein, the third set time T3 is defined as a time elapsed after the time measurement is started at Step S32 until the in-system pressure P of the second reduction-causing agent supply passage 72 reaches a third pressure value P3. The third pressure value P3 is approximately at the atmospheric pressure.

The third set time T3 is also obtainable by an experiment in advance. Alternatively, the third set time T3 can be set based on a total area of the injection hole of the injection nozzle 60 and a total area of the reduction-causing agent supply passage 70 (i.e., the first reduction-causing agent supply passage 71 and the second reduction-causing agent supply passage 72) and the pump unit 40.

When judging NO at Step S39, in other words, when the measurement time t is less than the third set time T3, the controller 5 keeps the injection nozzle 60 in the valve open state while keeping the pump 41 in a stopped state.

Judging YES at Step S39, the controller 5 closes the valve of the injection nozzle 60 (Step S40). Thus, the urea solution drawing-back process S3 in the second reduction-causing agent supply passage 72 and the injection nozzle 60 is finished.

Figure 10:
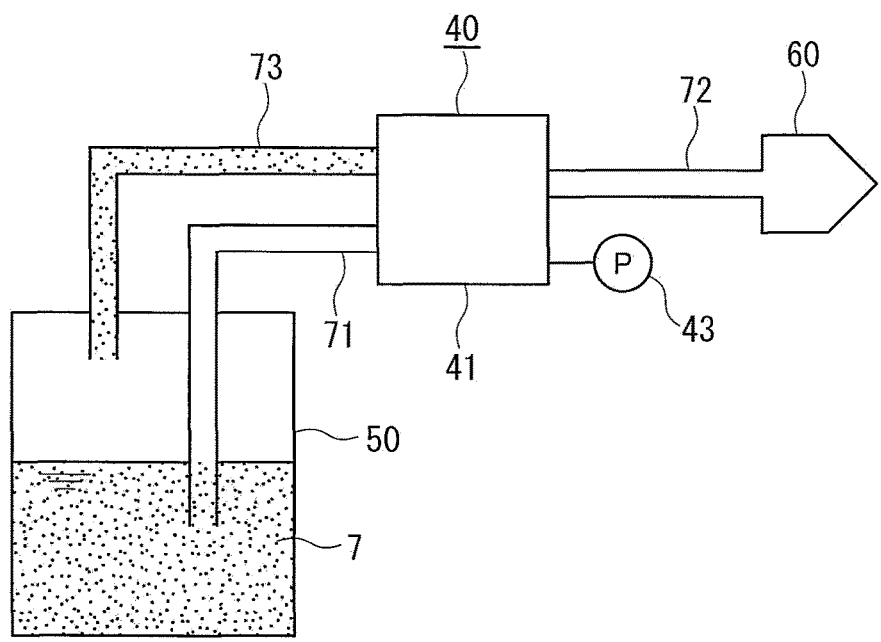
FIG. 10 is a still further illustration for describing the operation in the urea solution drawing-back process.

At the time when the urea solution drawing-back process S3 is completed, as shown in FIG. 10, approximately the entire length of the reduction-causing agent supply passage 70 (i.e., the first reduction-causing agent supply passage 71 and the second reduction-causing agent supply passage 72), approximately the entire volume of the pump unit 40, and approximately the entire volume of the injection nozzle 60 are purged with the gas while the bypass line 73 is substantially full of the urea solution. The valve of the injection nozzle 60 is kept closed at Step S40.

Execution Frequency Judgment Treatment

As shown in FIG. 3, after the urea solution drawing-back process S3 is completed, the controller 5 judges whether or not the variable N representing an execution frequency of the compressed gas discharge process S5 is larger than the preset value N0 (Step S4). Judging N0 at Step S4, the controller 5 performs the compressed gas discharge process S5. On the other hand, judging YES at Step S4, the controller 5 finishes the control shown in FIG. 3. Accordingly, for instance, when the set value N0 is 2, the controller 5 finishes the control when performing the compressed gas discharge process S5 twice to turn the variable N to 3.

The set value N0 may be set depending on the volume of the second reduction-causing agent supply passage 72. In other words, a gas discharge amount at a single execution in the compressed gas discharge process S5 differs depending on the volume of the second reduction-causing agent supply passage 72. The gas discharge amount is increased as the volume of the second reduction-causing agent supply passage 72 is increased.

Since a purpose of the compressed gas discharge process S5 is to discharge a small amount of the urea solution remaining in the injection nozzle 60 to an outside of the injection nozzle 60, a certain gas discharge amount is required. For this reason, when the volume of the second reduction-causing agent supply passage 72 is small and the gas discharge amount is small, the compressed gas discharge process S5 needs to be repeated several times. The set value N0 sets this execution frequency.

Compressed Gas Discharge Treatment

Judging NO at Step S4 as shown in FIG. 3, the controller 5 performs the compressed gas discharge process S5. The compressed gas discharge process S5 will be described in detail with reference to the flowchart in FIG. 5, the illustrations describing the operations in FIGS. 12 to 16, and the graph showing a pressure change in FIG. 17.

Figure 12:
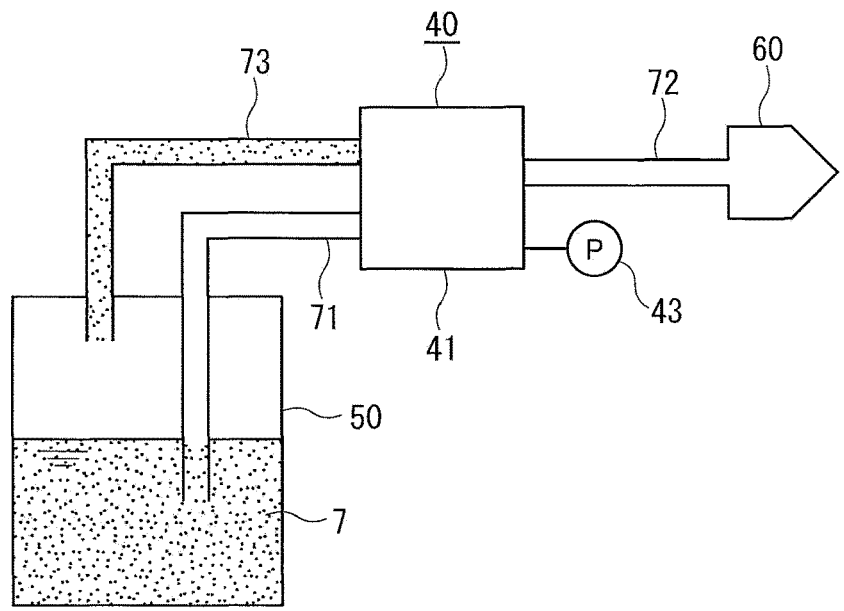
FIG. 12 is an illustration for describing an operation in the compressed gas discharge process.

Since the compressed gas discharge process S5 is started after the urea solution drawing-back process S3 is completed, as shown in FIG. 12, an end of the first reduction-causing agent supply passage 71 in the tank 50 is disposed in the urea solution 7 of the tank 5 and a liquid surface of the urea solution 7 in the first reduction-causing agent supply passage 71 is positioned at a height balanced with the atmospheric pressure. The rest of the volume of the first reduction-causing agent supply passage 71, approximately the entire volume of the pump unit 40, and approximately the entire volume of the second reduction-causing agent supply passage 72 and the injection nozzle 60 are purged with the gas. On the other hand, although depending on a sealing performance of the check valve 44, the bypass line 73 is substantially filled with the urea solution 7.

Figure 5:
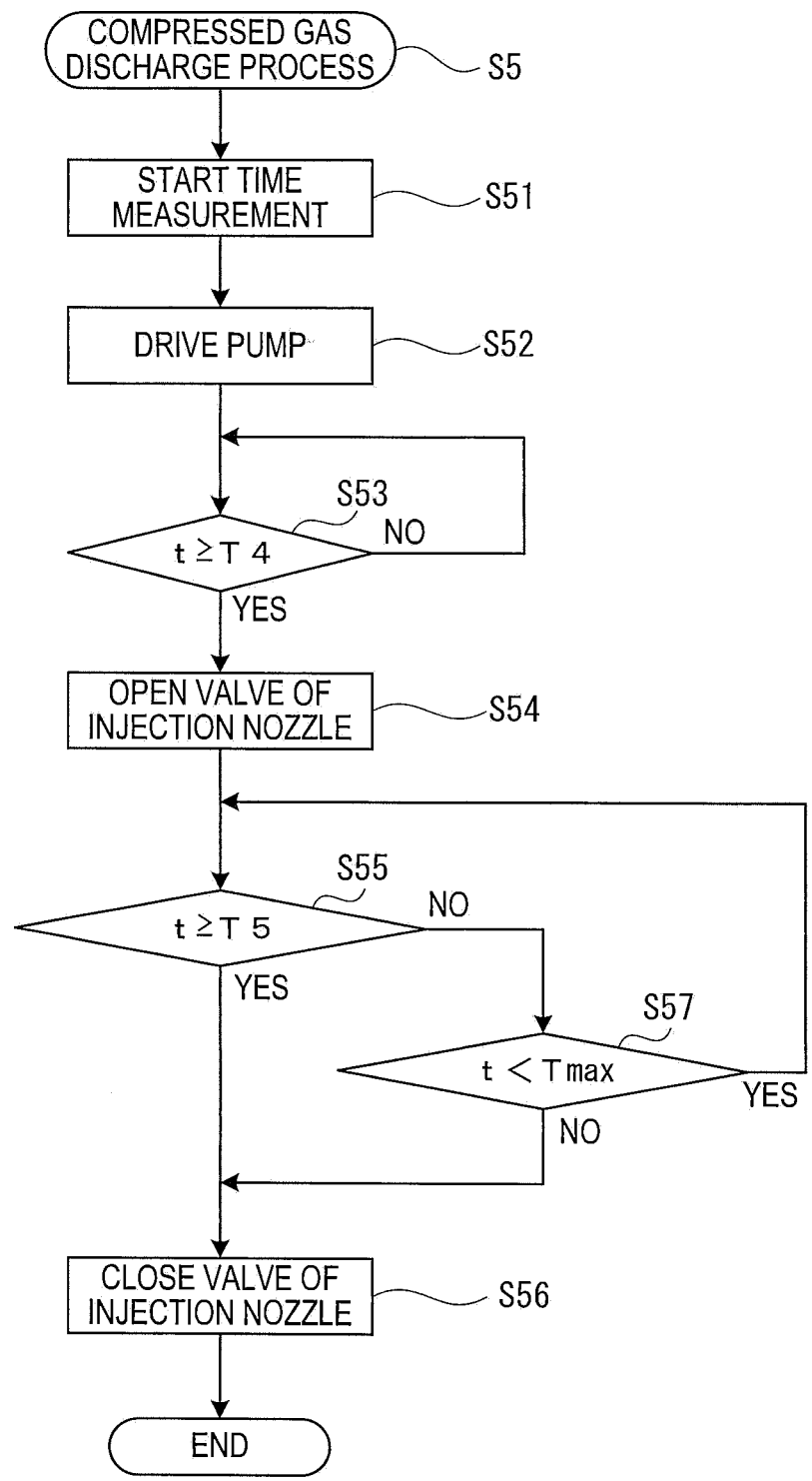
FIG. 5 is a flowchart showing a compressed gas discharge process.

The controller 5 restarts measuring the time using the timer 6 as shown in FIG. 5 (Step S51). Specifically, the measurement time t is reset to 0 and the time measurement is restarted using the timer 6.

Figure 13:
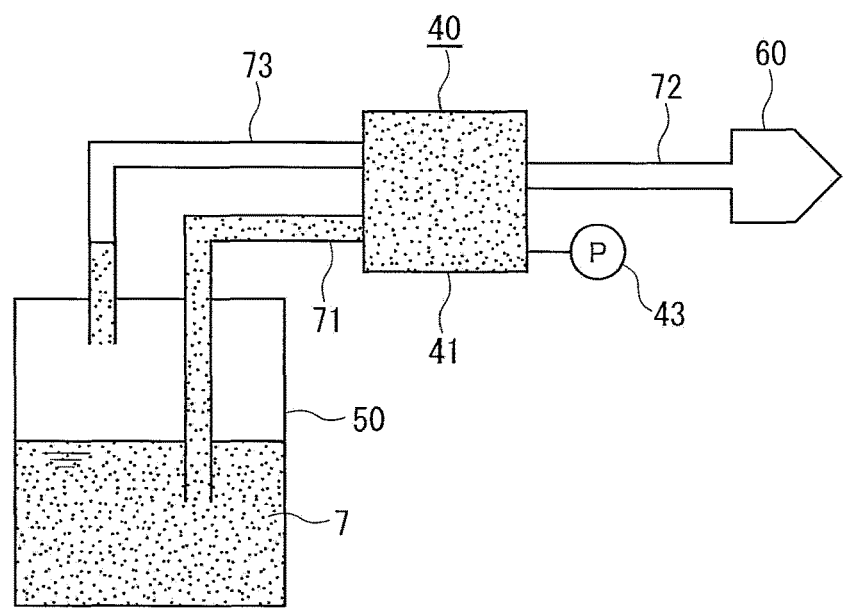
FIG. 13 is another illustration for describing the operation in the compressed gas discharge process.
Figure 17:
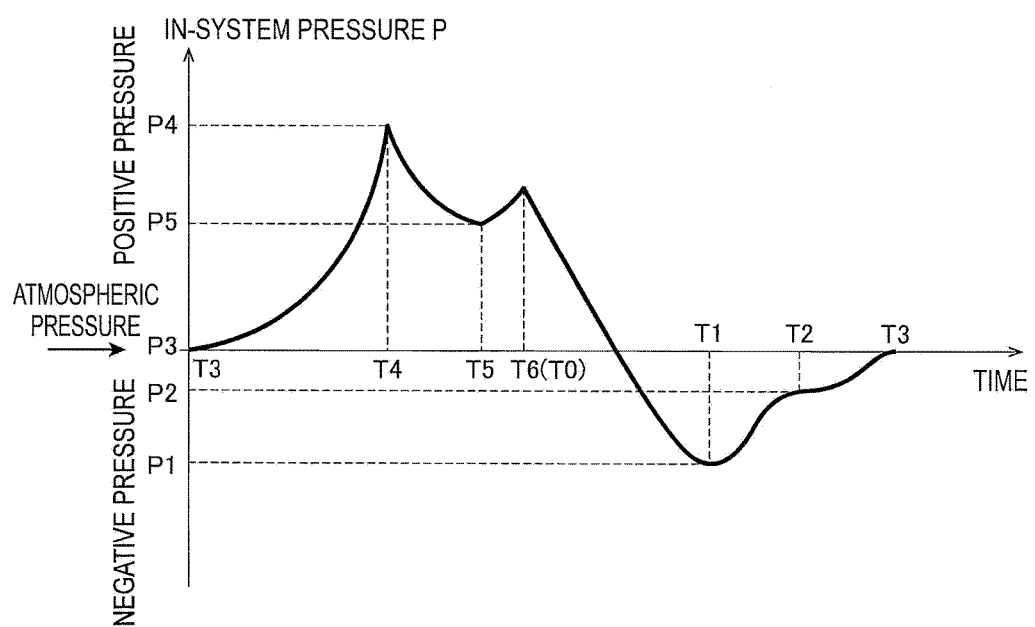
FIG. 17 is a graph showing a change in the in-system pressure during the operation in the compressed gas discharge process and the operation in a second urea solution drawing-back process.

Next, the controller 5 drives the pump 41 while keeping the valve of the injection nozzle 60 closed (Step S52). Subsequently, as shown in FIG. 13, the urea solution 7 is flowed from the tank 50 into the first reduction-causing agent supply passage 71. Moreover, a pressure applied to the check valve 44 is increased to pump the gas present inside the first reduction-causing agent supply passage 71 and the pump unit 40 to the bypass line 73, the second reduction-causing agent supply passage 72 and the injection nozzle 60. Accordingly, as shown in FIG. 17, the in-system pressure P in the second reduction-causing agent supply passage 72 is gradually increased from the atmospheric pressure P3.

Figure 14:
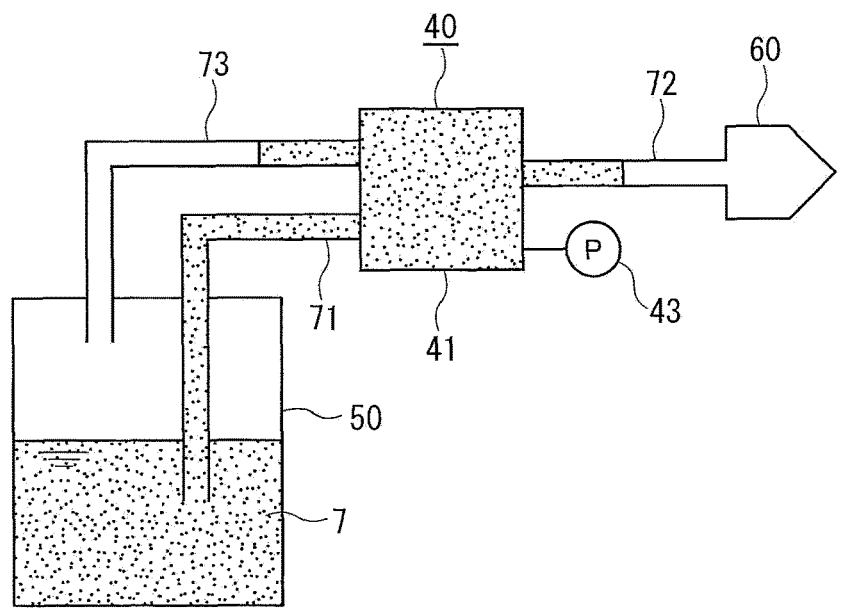
FIG. 14 is still another illustration for describing the operation in the compressed gas discharge process.

Further, when the operation of the pump 41 is continued, as shown in FIG. 14, the urea solution 7 drawn from the tank 50 to the first reduction-causing agent supply passage 71 is flowed into the bypass line 73 and the second reduction-causing agent supply passage 72. Since the injection nozzle 60 is in the valve closed state, when the urea solution 7 is flowed into the second reduction-causing agent supply passage 72, the gas present inside the second reduction-causing agent supply passage 72 and the injection nozzle 60 is compressed to further increase the in-system pressure P. The in-system pressure P is increased up to about $90 \times 10^4$ Pa (9 bar) at the maximum, so that a volume of the gas is decreased to about ⅑.

The controller 5 judges whether or not the measurement time t started after being reset to 0 at Step S51 is equal to or more than a predetermined fourth set time T4 (Step S53). It should be noted that, since the time for the controller 5 to perform Steps S51 and S52 is very short, the measurement time t started at Step S51 is equal to the elapsed time after the pumping unit in a form of the pump 41 is operated.

Herein, the fourth set time T4 is defined as a time elapsed after the time measurement is started at Step S51 until the in-system pressure P of the second reduction-causing agent supply passage 72 reaches a fourth pressure value P4 (e.g., $90 \times 10^4$ Pa).

When judging NO at Step S53, in other words, when the measurement time t is less than the fourth set time T4, the controller 5 keeps the pump 41 in operation while keeping the injection nozzle 60 in the valve closed state.

Judging YES at Step S53, the controller 5 opens the valve of the injection nozzle 60 (Step S54). Since the in-system pressure P of the second reduction-causing agent supply passage 72 is raised to the fourth pressure value P4 that is higher than the atmospheric pressure, a part of the compressed gas is vigorously discharged from the injection nozzle 60 to the exhaust pipe 11. With this gas discharge, the urea solution 7 remaining inside the injection nozzle 60 and the urea solution 7 remaining in the injection hole 63 of the injection nozzle 60 can be discharged to the exhaust pipe 11. Particularly, since the gas is compressed by operating the pump 41 to supply the urea solution 7 into the second reduction-causing agent supply passage 72, the urea solution 7 remaining in the injection nozzle 60 can be blown out by a high pressure P4. For instance, although a suction pressure in the urea solution drawing-back process S3 is about $9.8 \times 10^4$ Pa ($\approx 1$ kgf/cm$^2$) or less, a blowing pressure by discharging the compressed gas at Step S54 can be raised to about 40 to $50 \times 10^4$ Pa ($\approx 4$ to 5 kgf/cm$^2$), so that the remaining urea solution can be effectively discharged by the compressed gas discharge process S5 as compared with the urea solution drawing-back process S3.

Figure 16:
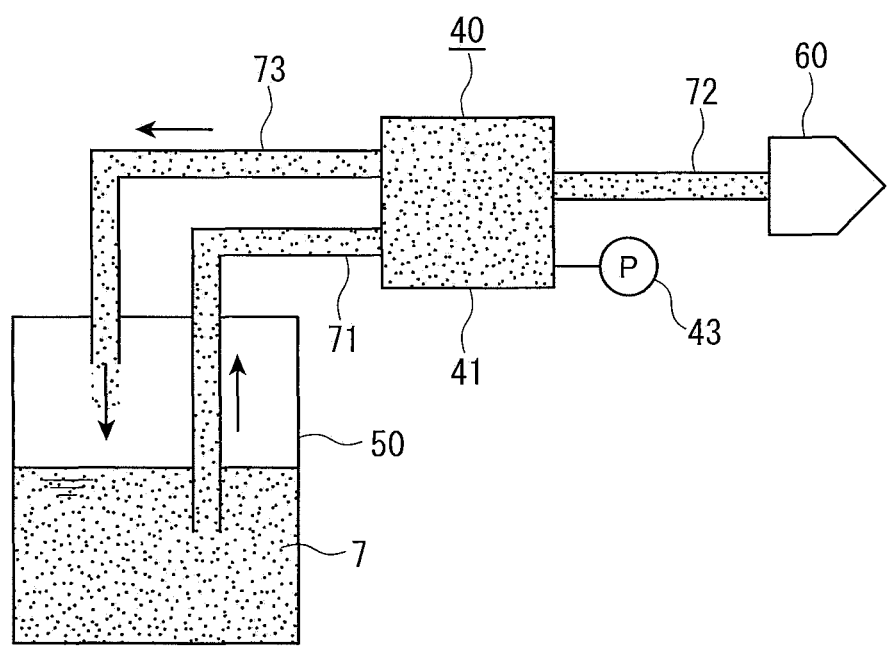
FIG. 16 is a still further illustration for describing the operation in the compressed gas discharge process.

When the valve of the injection nozzle 60 is opened at Step S54, the in-system pressure P of the second reduction-causing agent supply passage 72 is decreased as shown in FIG. 17. Further, since a part of the compressed gas in the second reduction-causing agent supply passage 72 and the injection nozzle 60 is discharged from the injection hole 63, the urea solution present inside the second reduction-causing agent supply passage 72 is transferred toward the injection nozzle 60 as shown in FIG. 16.

Next, the controller 5 judges whether or not the measurement time t started at Step S51 is equal to or more than a predetermined fifth set time T5 (Step S55).

Herein, the fifth set time T5 means an elapsed time after the measurement time t is reset to 0 to start the measurement at Step S51. The fifth set time T5 is set to be less than a time when the urea solution 7, which is being transferred toward the injection nozzle 60 in the second reduction-causing agent supply passage 72 by opening the valve of the injection nozzle 60 at Step S54, reaches the injection nozzle 60. In other words, provided that the time for the urea solution 7 to reach the injection nozzle 60 after the time measurement is started at Step S51 is represented by Tmax, the fifth set time T5 is less than Tmax.

The fifth set time T5 is also obtainable by an experiment in advance. Alternatively, the fifth set time T5 can be set based on the volume of the second reduction-causing agent supply passage 72 and the total area of the injection hole 63 of the injection nozzle 60. In the exemplary embodiment, the control is thus performed by judging whether or not the elapsed time t exceeds the predetermined set times T1 to T5 at Steps S34, S36, S39, S53 and S55. Accordingly, an opening/closing timing of the injection nozzle 60, a stopping timing of the pump 41, and the like can be set by feedforward control. As compared with the control based on detection values of various sensors, the controller 5 can easily control only by comparing the elapsed time t with the set times T1 to T5 while kinds and the number of the sensors can be decreased.

Judging NO at Step S55, the controller 5 judges whether or not the measurement time t is less than the time Tmax (Step S57). Since the fifth set time T5 is originally set at less than Tmax, when the measurement time t is less than the fifth set time T5 (in the case of No at Step S55), the judgment is made YES at Step S57. Accordingly, when judging NO at Step S53 and YES at Step S57, in other words, when the measurement time t is less than the fifth set time T5, the controller 5 keeps the injection nozzle 60 in the valve open state.

When the measurement time t is equal to or more than the fifth set time T5, the controller 5 judges YES at Step S55.

Judging YES at Step S55, the controller 5 closes the valve of the injection nozzle 60 (Step S56). Subsequently, since the gas remains at least in the injection nozzle 60 as shown in FIG. 16, the transfer of the urea solution 7 toward the injection nozzle 60 in the first reduction-causing agent supply passage 72 is stopped. Accordingly, re-supply of the urea solution 7 into the injection nozzle 60 in the compressed gas discharge process S5 does not occur. Consequently, the compressed gas discharge process S5 is finished.

Even when the value of the fifth set time T5 is erroneously set at Tmax or more, the controller 5 judges NO at Step S57 when the measurement time t is equal to or more than Tmax, and closes the valve of the injection nozzle 60 at Step S56 to finish the compressed gas discharge process S5. Accordingly, when the urea solution 7 is adversely transferred into the injection nozzle 60, the controller 5 can prevent the urea solution 7 from being injected into the exhaust pipe 11 by keeping the injection nozzle 60 in the valve open state.

After the compressed gas discharge process S5 is finished, the controller 5 performs an updating process by incrementing the variable N by 1 (Step S6). The controller 5 again performs the urea solution drawing-back process S3. Specifically, when the compressed gas discharge process S5 is finished, approximately the entire length of the first reduction-causing agent supply passage 71, approximately the entire volume of the pump unit 40, and the bypass line 73 are substantially filled with the urea solution 7. The urea solution 7 also remains in the second reduction-causing agent supply passage 72. Further, the in-system pressure P is also higher than the atmospheric pressure as shown in FIG. 17. Accordingly, by again performing the urea solution drawing-back process S3, when the control is finished, approximately the entire volume of the pump unit 40, the first reduction-causing agent supply passage 71, and the second reduction-causing agent supply passage 72 can be purged with gas while the in-system pressure P can be decreased to the atmospheric pressure, as shown in FIG. 10.

It should be noted that the in-system pressure P is increased in the period between T5 and T6 in FIG. 17 because the pump 41 is kept in operation with the injection nozzle 60 being in the valve closed state after the valve of the injection nozzle 60 is closed at Step S56 until the switching valve 42 is switched in the backward direction at Step S33.

The controller 5 finishes the compressed gas discharge process S5 shown in FIG. 3 at T6 in FIG. 17 and starts the urea solution drawing-back process S3, in which the controller 5 resets the measurement time t to 0 at Step S32. Accordingly, the controller 5 restarts the measurement of the time t with the timing of the time T6 defined as the time T0.

Advantage(s) of Exemplary Embodiment(s)

According to the above exemplary embodiment, by controlling to drive the pump 41, the switching valve 42 and the injection nozzle 60, the controller 5 performs the compressed gas discharge process S5, whereby the gas trapped in the second reduction-causing agent supply passage 72 and the injection nozzle 60 is compressed to increase the in-system pressure and the compressed gas is discharged by opening the injection nozzle 60, so that the urea solution 7 remaining in the injection nozzle 60 can be discharged into the exhaust pipe 11. Compared with the urea solution drawing-back process S3 by which the urea solution 7 remaining in the injection nozzle 60 is drawn, by discharging the compressed gas, the urea solution 7 can be discharged at a higher pressure and more effectively removed from the injection nozzle 60. Accordingly, the urea solution 7 can be prevented from remaining in the injection nozzle 60 to be crystallized, which can prevent crystallized urea from sticking the needle valve 62 to immobilize the needle valve 62 and clogging the injection hole 63, thereby preventing the urea solution 7 from being unable to be injected.

Second Exemplary Embodiment

Figure 18:
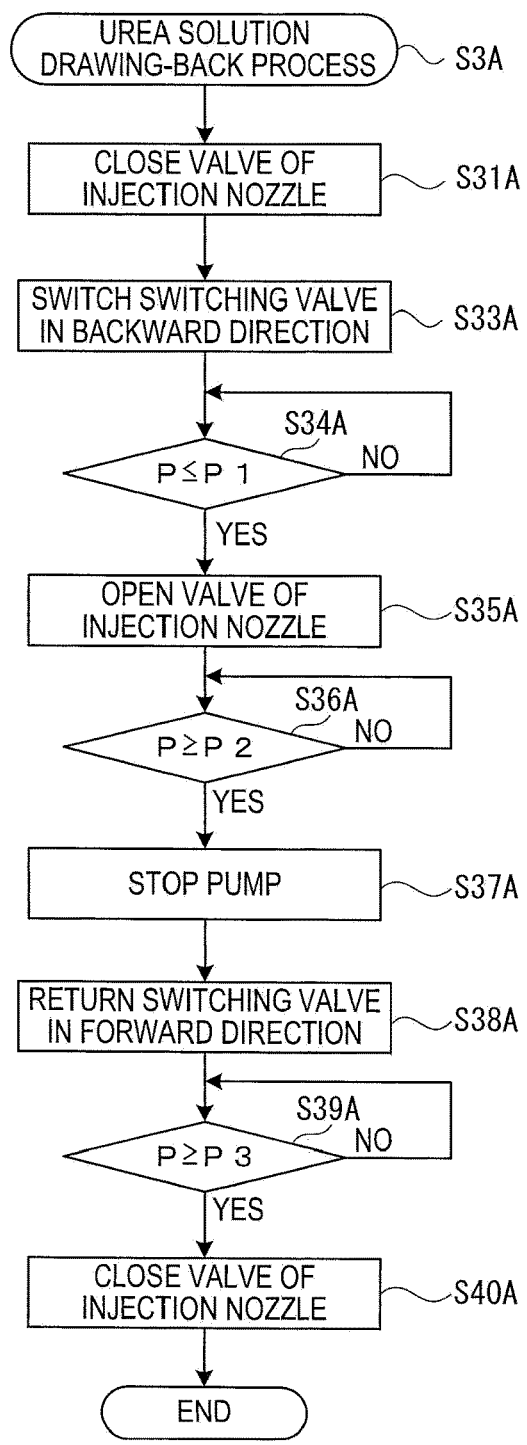
FIG. 18 is a flowchart describing a urea solution drawing-back process in a second exemplary embodiment.

Next, the second exemplary embodiment will be described. In the second exemplary embodiment, a urea solution drawing-back process S3A shown in FIG. 18 is performed in place of the urea solution drawing-back process S3 in the first exemplary embodiment, and a compressed gas discharge process S5A is performed in place of the compressed gas discharge process S5 shown in FIG. 19 in the first exemplary embodiment. Since other processes in the second exemplary embodiment are the same as those in the first exemplary embodiment, a description of the processes is omitted.

Urea Solution Drawing-Back Treatment S3A

In the urea solution drawing-back process S3A, Steps S31A to 540A are performed as shown in FIG. 18. Among the above steps, Steps S33A, S35A, S37A, S38A and 540A are the same as Steps S33, S35, S37, S38 and S40 of the urea solution drawing-back process S3 in the first exemplary embodiment. Accordingly, a description of Steps S33A, S35A, S37A, S38A and 540A is omitted. Moreover, since the urea solution drawing-back process S3A does not require the measurement of the time t, the process of starting to measure the time at Step S32 in the urea solution drawing-back process S3 is not performed.

In Step S34A, the controller 5 judges whether or not the in-system pressure P measured by the pressure gauge 43 is equal to or less than the first pressure value P1. In other words, also in the second exemplary embodiment in the same manner as in the first exemplary embodiment, when the switching valve 42 is switched to the backward direction at Step S33A to draw back the urea solution present inside the reduction-causing agent supply passage 70 to the tank 50, the positive pressure of the in-system pressure P is decreased to the negative pressure. When the in-system pressure P detected by the pressure gauge 43 is decreased to the first pressure value P1, the controller 5 judges YES at Step S34A to open the valve of the injection nozzle 60 (Step S35A).

When the valve of the injection nozzle 60 is opened at Step S35A, gas is flowed from the exhaust pipe 11 into the injection nozzle 60 and the reduction-causing agent supply passage 70, thereby gradually increasing the in-system pressure P as shown in FIG. 11. When the in-system pressure P detected by the pressure gauge 43 is increased to the second pressure value P2, the controller 5 judges YES at Step S36A to stop the pump 41 (Step S37A). It should be noted that both the first pressure value P1 and the second pressure value P2 are the negative pressure and the second pressure value P2 is higher than the first pressure value P1 as described above.

After stopping the pump 41, the controller 5 switches back the switching valve 42 in a forward direction (Step S38A). At this time, since the injection nozzle 60 is kept in the valve open state and an inside of the tank 50 is under the atmospheric pressure, the in-system pressure P is gradually increased to return to the atmospheric pressure. When the in-system pressure P detected by the pressure gauge 43 is increased to the third pressure value P3, the controller 5 judges YES at Step S39A to close the valve of the injection nozzle 60 (Step S40A). The third pressure value P3 is higher than the second pressure value P2 and is almost equal to the atmospheric pressure. The urea solution drawing-back process S3A is thus finished.

Compressed Gas Discharge Treatment S5A

Figure 19:
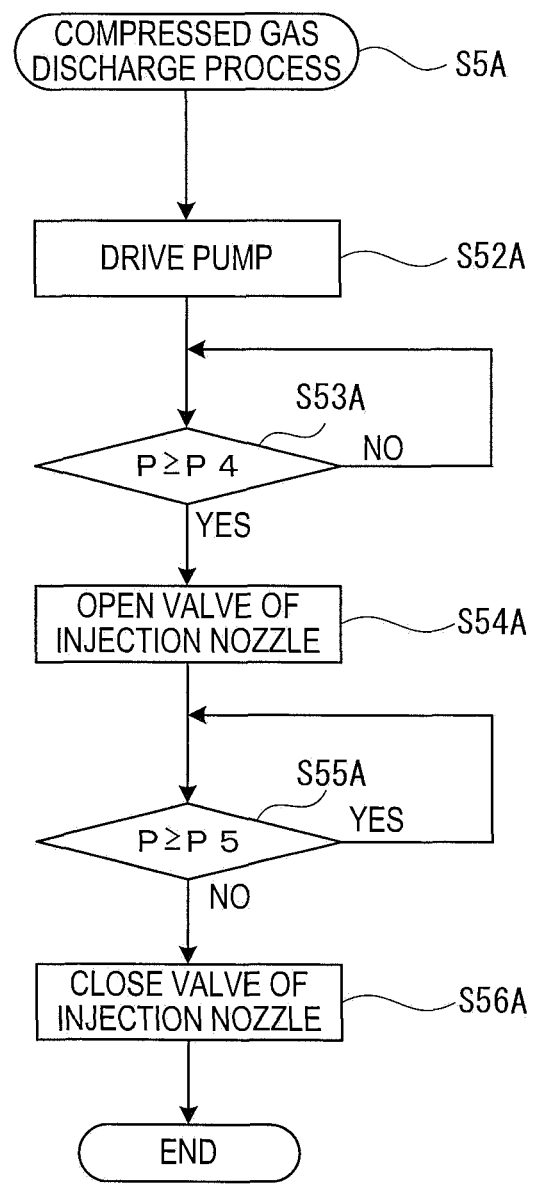
FIG. 19 is a flowchart describing a compressed gas discharge process in the second exemplary embodiment.

In the compressed gas discharge process S5A, Steps S52A to S56A are performed as shown in FIG. 19. Among the above steps, Steps S52A, S54A and S56A are the same processes as Steps S52, S54 and S56 of the compressed gas discharge process S5 in the first exemplary embodiment. Accordingly, a description of Steps S33A, S35A, S37A, S38A and 540A is omitted. Moreover, since the compressed gas discharge process S5 also does not require the measurement of the time t, the process of starting to measure the time at Step S51 in the compressed gas discharge process S5 is not performed.

In Step S53A, the controller 5 judges whether or not the in-system pressure P measured by the pressure gauge 43 is equal to or more than the fourth pressure value P4. In other words, also in the second exemplary embodiment in the same manner as in the first exemplary embodiment, when the pump 41 is driven with the injection nozzle 60 kept closed at Step S52A, the in-system pressure P is increased from the atmospheric pressure as shown in FIG. 17.

At this time, in the same manner as shown in FIGS. 13 and 14 in the first exemplary embodiment, the urea solution 7 is flowed from the tank 50 into the first reduction-causing agent supply passage 71, so that the gas present inside the first reduction-causing agent supply passage 71 and the pump unit 40 is pumped to the bypass line 73, the second reduction-causing agent supply passage 72 and the injection nozzle 60.

Figure 15:
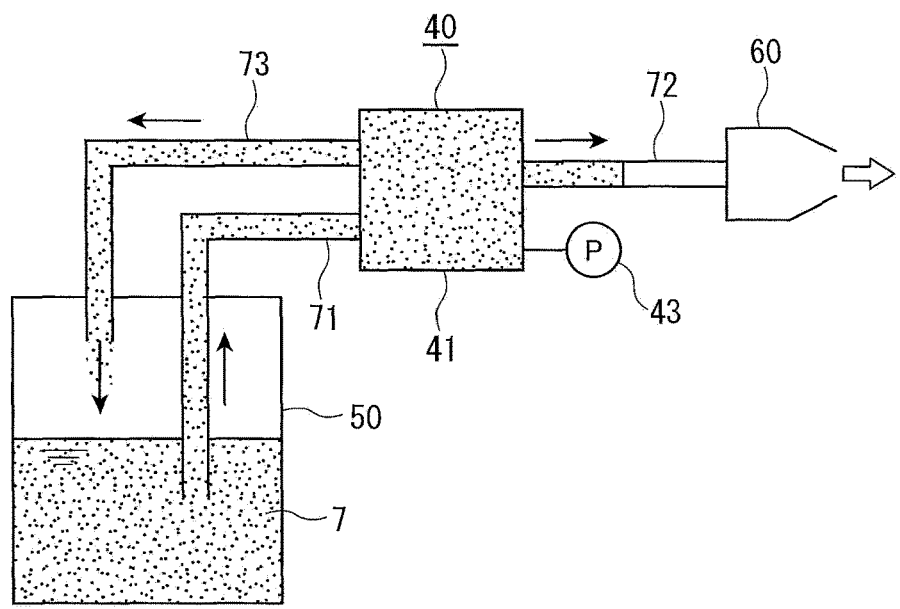
FIG. 15 is a further illustration for describing the operation in the compressed gas discharge process.

Judging YES at Step S53A, the controller 5 opens the valve of the injection nozzle 60 (Step S54A). Since the in-system pressure P of the second reduction-causing agent supply passage 72 is raised to be higher than the atmospheric pressure in the same manner as shown in FIG. 15 of the first exemplary embodiment, a part of the compressed gas is discharged from the injection nozzle 60 to the exhaust pipe 11. With this gas discharge, the urea solution 7 remaining inside the injection nozzle 60 and the urea solution 7 remaining in the injection holes 63 of the injection nozzle 60 can be discharged to the exhaust pipe 11.

Moreover, when the valve of the injection nozzle 60 is opened at Step S54A, the in-system pressure P is decreased as shown in FIG. 17 of the first exemplary embodiment. Further, since a part of the compressed gas present in the second reduction-causing agent supply passage 72 and the injection nozzle 60 is discharged from the injection hole 63, the urea solution present inside the second reduction-causing agent supply passage 72 is transferred toward the injection nozzle 60 as shown in FIG. 16 of the first exemplary embodiment.

Next, the controller 5 judges whether or not the in-system pressure P detected by the pressure gauge 43 is equal to or less than the fifth pressure value P5. When the valve of the injection nozzle 60 is opened at Step S54A, the in-system pressure P is decreased in the same manner as in the first exemplary embodiment. The fifth pressure value P5 is set at a pressure under which the urea solution 7 present inside the second reduction-causing agent supply passage 72 does not reach the injection nozzle 60. Specifically, the fifth pressure value P5 is lower than the fourth pressure value P4 and higher than the third pressure value P3.

Accordingly, while judging YES at Step S55A, the controller 5 continues to discharge the gas by opening the valve of the injection nozzle 60.

On the other hand, judging NO at S55A, the controller 5 closes the valve of the injection nozzle 60 (Step S56A). With this operation, the transfer of the urea solution 7 toward the injection nozzle 60 in the first reduction-causing agent supply passage 72 is stopped in the same manner as shown in FIG. 16 of the first exemplary embodiment. Moreover, since the operation of the pump 41 is continued with the injection nozzle 60 in the valve closed state, the in-system pressure P in the second reduction-causing agent supply passage 72 is increased as shown in FIG. 17 of the first exemplary embodiment. Consequently, the compressed gas discharge process S5A is finished.

Reason of Control Capability of in-System Pressure P

Next, a reason why the opening/closing timing of the injection nozzle 60 and the like are controllable by the in-system pressure P measured using the pressure gauge 43 will be described with reference to a setting method of the fifth pressure value P5 at Step S55A.

Figure 20:
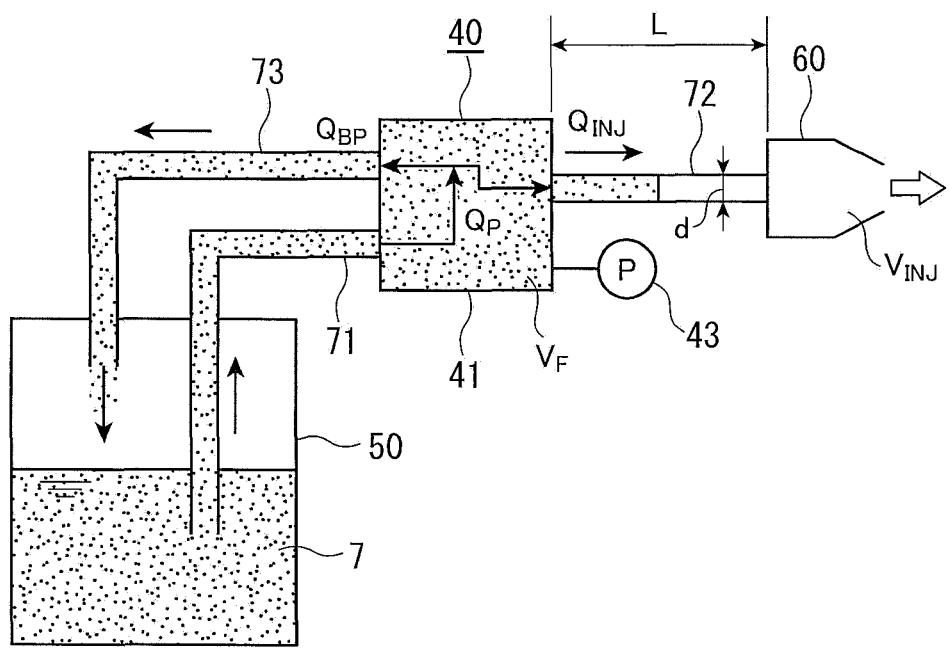
FIG. 20 is an illustration for describing a control operation by an in-system pressure in the second exemplary embodiment.

Firstly, as shown in FIG. 20, a discharge amount per hour of the pump 41 is represented by $Q_P$, an amount to be flowed into the second reduction-causing agent supply passage 72 among the discharge amount of the pump 41 is represented by $Q_{INJ}$, an amount to be flowed into the bypass line 73 among the discharge amount of the pump 41 is represented by $Q_{BP}$, a space volume inside the pump unit 40 is represented by $V_F$, a length of the second reduction-causing agent supply passage 72 between the injection nozzle 60 and the pump 41 is represented by L, an inner diameter of the second reduction-causing agent supply passage 72 is represented by d, and an internal space volume of the injection nozzle 60 is represented by $V_{INJ}$. The space volume $V_F$ inside the pump unit 40 is a space volume mainly for attaching the filter 462.

When the pump 41 is operated with the valve of the injection nozzle 60 closed, the in-system pressure is increased to be balanced, so that compression of the gas is stopped, whereby the amount $Q_{INJ}$ to be flowed into the second reduction-causing agent supply passage 72 is made "0". At this time, the urea solution 7 pumped by the operation of the pump 41 passes through the bypass line 73 to be returned to the tank 50.

A case where the pump 41 is driven with the valve of the injection nozzle 60 closed and the in-system pressure of the second reduction-causing agent supply passage 72 is increased to be balanced is assumed. In this case, since an amount of the gas inside the second reduction-causing agent supply passage 72 is small, the pressure and the volume of the gas are controllable by a temperature of a component having a large thermal volume, for instance, the pump 41, the second reduction-causing agent supply passage 72, the injection nozzle 60, and the exhaust pipe 11 attached with the injection nozzle 60, so that the pressure and the volume of the gas are assumed to be isothermally changed Accordingly, provided that a volume of a space occupied by the gas is represented by V and a pressure of the space occupied by the gas is represented by P in the second reduction-causing agent supply passage 72 and the injection nozzle 60, a formula (1) is established. In the formula (1), $P_a$ is a pressure, which is approximately the atmospheric pressure, in the second reduction-causing agent supply passage 72 after the urea solution drawing-back process S3 is completed.

Numerical Formula 1

$$PV = P_a\left(V_F + \frac{\pi}{4}d^2L + V_{INJ}\right) \quad (1)$$

Provided that the set pressure is represented by $P_0$ (i.e., an absolute pressure in the order of $10 \times 10^5$ Pa=10 bar), a formula (2) is obtained in a balanced state. Since $P_0$ is known, $V_0$ can be calculated from the formula (2). When the in-system pressure actually measured by the pressure gauge 43 is $P_0$, the volume of the gas in the reduction-causing agent supply passage 70 is also defined as $V_0$.

Numerical Formula 2

$$P_0 V_0 = P_a\left(V_F + \frac{\pi}{4}d^2L + V_{INJ}\right) \quad (2)$$

When the valve of the injection nozzle 60 is opened while the volume of the gas is at $V_0$, the compressed gas is injected from the injection hole 63 of the injection nozzle 60 and the urea solution 7 is flowed also into the second reduction-causing agent supply passage 72 between the pump 41 and the injection nozzle 60. The mass of the compressed gas present in the second reduction-causing agent supply passage 72 and the injection nozzle 60 before the valve of the injection nozzle 60 is opened is stored. Accordingly, provided that the volume of the gas in the second reduction-causing agent supply passage 72 is represented by V, the pressure of the gas is represented by P, a density of the gas is represented by $\rho$, a temperature of the gas is represented by T, and a mass flow of the gas injected from the injection hole 63 is represented by mg, a formula (3) is established.

Numerical Formula 3

$$\frac{d}{dt}(\rho V) + \dot{m}g = 0 \quad (3)$$

Since the state change of the gas is assumed as isothermal change as described above, a state equation of the gas in this case is represented by a formula (4). In the formula, R represents a gas constant.

Numerical Formula 4

$$\rho = \frac{P}{RT} \quad (4)$$

The state equation represented by the formula (4) is assigned into the formula (3) to obtain a formula (5).

Numerical Formula 5

$$\frac{d}{dt}\left(\frac{PV}{RT}\right) + \dot{m}g = 0 \quad (5)$$

The formula (5) is expanded to obtain a formula (6). Moreover, since a change in a total gas volume of the gas volume in the second reduction-causing agent supply passage 72 and the gas volume in the injection nozzle 60 is represented by a formula (7), the formula (7) is assigned into the formula (6) to obtain a formula (8).

Numerical Formula 6

$$\frac{V}{RT}\frac{dP}{dt} + \frac{P}{RT}\frac{dV}{dt} + \dot{m}g = 0 \quad (6)$$

Numerical Formula 7

$$\frac{dV}{dt} = -\dot{Q}_{INJ} \quad (7)$$

Numerical Formula 8

$$\frac{V}{RT}\frac{dP}{dt} - \frac{P}{RT}\dot{Q}_{INJ} + \dot{m}g = 0 \quad (8)$$

The mass flow mg is represented by a formula (9) since the gas can be handled as a compressible perfect gas.

Numerical Formula 9

$$\dot{m}g = aP\sqrt{\frac{\gamma}{RT}}\frac{M}{\left(1+\frac{\gamma-1}{2}M^2\right)^{\frac{\gamma+1}{2(\gamma-1)}}} \quad (9)$$

In the formula, a represents an area of the injection hole of the injection nozzle, P represents the in-system pressure, $\gamma$ represents a specific heat ratio of the gas ($C_P/C\gamma$=specific heat at constant pressure/specific heat at constant volume), and M represents a Mach number of the injection hole of the injection nozzle.

Subsequently, the formula (9) is assigned into the formula (8) to obtain a formula (10).

Numerical Formula 10

$$\frac{dP}{dt} = \frac{P}{V}\dot{Q}_{INJ} - a\frac{P}{V}\sqrt{\gamma RT}\frac{M}{\left(1+\frac{\gamma-1}{2}M^2\right)^{\frac{\gamma+1}{2(\gamma-1)}}} \quad (10)$$

$$= \frac{P}{V}\left(\dot{Q}_{INJ} - a\sqrt{\gamma RT}\frac{M}{\left(1+\frac{\gamma-1}{2}M^2\right)^{\frac{\gamma+1}{2(\gamma-1)}}}\right)$$

Although P, V and $Q_{INJ}$ on the right-hand side in the formula (10) momentarily change, the change may be considered as isothermal change, whereby T is not changed. Moreover, since an initial in-system pressure is in the order of $10\times10^5$ Pa=10 bar, the gas having a pressure in this level may be handled as a compressible perfect gas. Accordingly, during almost the entire time, in other words, while the in-system pressure is higher than about $1.9\times10^5$ Pa=1.9 bar, the Mach number is 1.0.

Figure 21:
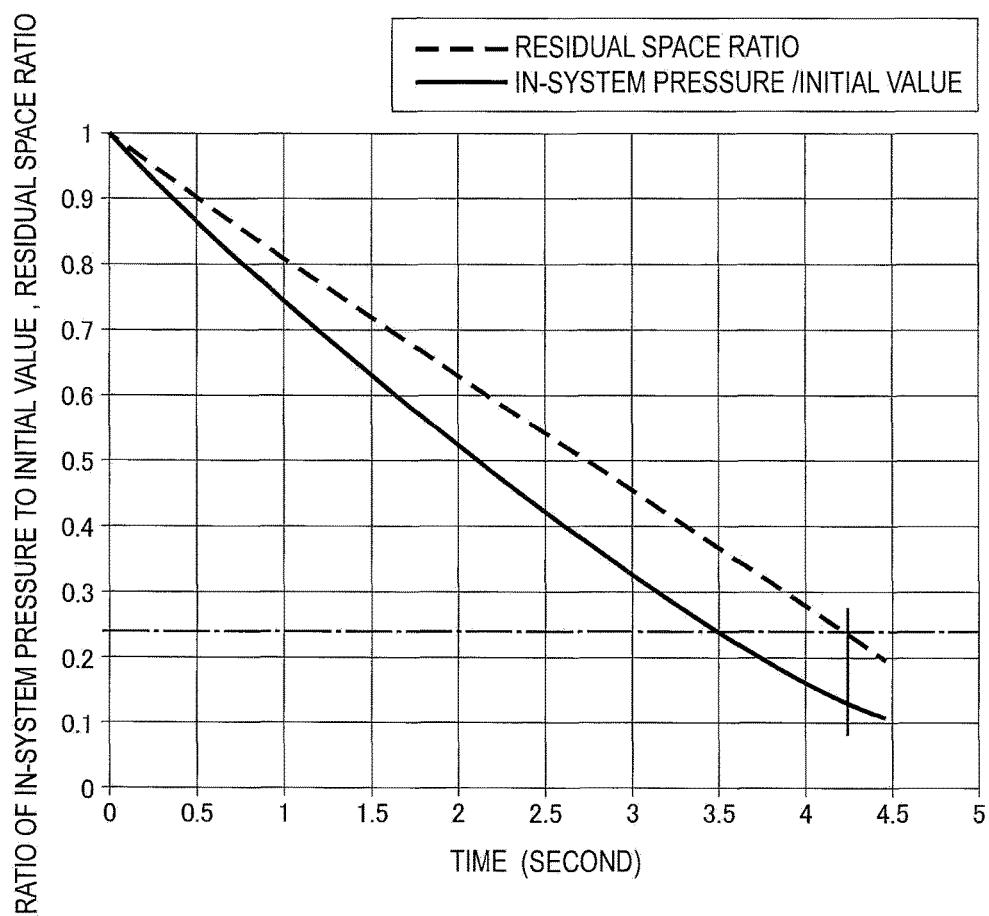
FIG. 21 is a graph showing a change in the in-system pressure and a change in a residual space in the compressed gas discharge process in the second exemplary embodiment by a ratio of the changes to an initial value.

Accordingly, in order to make the right-hand side of the formula (10) positive, for instance, when the entire area of the injection hole 63 is about 0.1 mm², the discharge amount of the pump 41 needs to be 78 kg/h or more. On the other hand, since the discharge amount of the current pump 41 is about ¼, $Q_{INJ}$ is supposed to be smaller. Further, since a part of the discharge amount of the pump 41 flows into the bypass line 73, the right-hand side of the formula (10) becomes negative when the in-system pressure is equal to or more than about $1.9\times10^5$ Pa=1.9 bar. Accordingly, the in-system pressure P continues to be lowered. This is shown by a simulation calculation result in a graph of FIG. 20. A dotted line in FIG. 21 shows a ratio of a residual space, which is present when the urea solution 7 present inside the second reduction-causing agent supply passage 72 is pumped toward the injection nozzle 60, relative to an initial space present when the in-system pressure P reaches the fourth pressure value P4 and the valve of the injection nozzle 60 is opened at Step S54A. A value (about 0.24) shown in a dash dot line in FIG. 21 shows that the residual space is present only in the injection nozzle 60. Accordingly, a ratio of the in-system pressure P relative to the initial value (the fourth pressure value P4) when the residual space ratio is decreased to the level shown in the dash dot line can be recognized. Accordingly, in the case as shown in FIG. 21, by closing the valve of the injection nozzle 60 before the ratio of the in-system pressure P relative to the initial value is decreased to about 0.13, the urea solution 7 can be prevented from reaching the injection nozzle 60. Consequently, by setting the fifth pressure value P5 to a value that provides a ratio of the fifth pressure value P5 relative to the fourth pressure value P4 being 0.13 or more, the valve of the injection nozzle 60 can be closed before the urea solution 7 reaches the injection nozzle 60.

In a case of the pump 41 having a large discharging capability, the same result can be attained by controlling in this step to fix the discharge amount of the pump at a value that makes the right-hand side of the formula (10) negative.

Although $Q_{INJ}$ is assumed to be constant in the simulation result shown in FIG. 21, as long as the right-hand side of the formula (10) is negative, the simulation result is basically not separated from a reality.

After the valve of the injection nozzle 60 is opened, the space in the second reduction-causing agent supply passage 72 is decreased by pumping of the pump 41 and the in-system pressure P is decreased. The in-system pressure P immediately before the urea solution 7 enters the injection nozzle 60 changes depending on the length (hose length) and the inner diameter of the second reduction-causing agent supply passage 72, a dead volume of the pump 41, the volume of the injection nozzle 60, and an in-system temperature. The fifth pressure value P5 can be set as a threshold pressure including some allowance. Accordingly, by measuring the in-system pressure P and comparing the in-system pressure P with the fifth pressure value P5, the valve of the injection nozzle 60 can be controlled to be closed before the urea solution 7 enters the injection nozzle 60 to avoid the urea solution 7 from entering.

Advantages of Second Exemplary Embodiment

According to the second exemplary embodiment as described above, the opening/closing timing of the injection nozzle 60 can be controlled based on the in-system pressure P measured by the pressure gauge 43. The first pressure value P1 to the fifth pressure value P5, which are the threshold values to be compared with the in-system pressure P can be obtained by the above simulation. Accordingly, compared with a case where the opening/closing timing of the injection nozzle 60 is set by performing an experiment and the like in advance, a preparation operation is facilitated. Particularly, even when the respective lengths of the hoses forming the first reduction-causing agent supply passage 71 and the second reduction-causing agent supply passage 72 are different, an individual experiment is not required, so that the preparation operation is facilitated.

The invention is not limited to the above-described exemplary embodiment, but includes modifications and improvements as long as the objects of the invention can be achieved.

For instance, a plurality of sensors configured to detect presence or absence of the urea solution 7 may be provided at a plurality of points of the reduction-causing agent supply passage 70. The controller 5 may control the injection nozzle 60, the pump 41 and the switching valve 42 depending on the position of the transferred urea solution 7, the position detected by the sensors.

In the second exemplary embodiment, the first pressure value P1 to the fifth pressure value P5 are calculated based on the simulation. However, the first pressure value P1 to the fifth pressure value P5 may be obtained by an experiment.

In the exemplary embodiments, the control is finished after the urea solution drawing-back process S3, S3A is completed. However, the control may be finished after the compressed gas discharge process S5, S5A is completed.

The invention claimed is:

1. A reduction-causing agent supply device, comprising:
   a tank configured to store a reduction-causing agent to be supplied into an exhaust pipe of an engine;
   a pumping unit comprising a pump configured to pump the reduction-causing agent stored in the tank;
   a reduction-causing agent supply passage configured to supply the pumped reduction-causing agent;
   an injection nozzle configured to inject the reduction-causing agent supplied through the reduction-causing agent supply passage into the exhaust pipe;
   a drawing-back unit comprising the pump and a switching valve and being configured to draw back the reduction-causing agent present inside the reduction-causing agent supply passage toward the tank; and
   a controller configured to control an operation of each of the pumping unit, the injection nozzle and the drawing-back unit, wherein
   the controller is configured to perform a reduction-causing agent drawing-back process and a compressed gas discharge process, after the engine is stopped, wherein
   in the reduction-causing agent drawing-back process; the controller is configured to
     operate the drawing-back unit, while a valve of the injection nozzle is closed, to draw back the reduction-causing agent present inside the reduction-causing agent supply passage toward the tank; and
     operate the drawing-back unit, while the valve of the injection nozzle is open, to introduce gas present inside the exhaust pipe into the injection nozzle and the reduction-causing agent supply passage, and
   in the compressed gas discharge process; the controller is configured to
     operate the pumping unit, while the valve of the injection nozzle is closed, to supply the reduction-causing agent into the reduction-causing agent supply passage to compress the gas introduced in the reduction-causing agent supply passage;
     open the valve of the injection nozzle to discharge the compressed gas into the exhaust pipe through the injection nozzle; and
     close the valve of the injection nozzle before the reduction-causing agent present inside the reduction-causing agent supply passage reaches the injection nozzle while the pump is kept in operation.

2. The reduction-causing agent supply device according to claim 1, wherein
   in the reduction-causing agent drawing-back process; the controller is configured to operate the drawing-back unit, while the valve of the injection nozzle is closed, to draw back the reduction-causing agent present inside the reduction-causing agent supply passage toward the tank;
   at an elapse of a predetermined first set time after the drawing-back unit starts to be operated, open the valve of the injection nozzle to introduce the gas present inside the exhaust pipe into the injection nozzle and the reduction-causing agent supply passage;
   at an elapse of a predetermined second set time after the drawing-back unit starts to be operated, stop the drawing-back unit; and
   at an elapse of a predetermined third set time after the drawing-back unit starts to be operated, close the valve of the injection nozzle, and
   in the compressed gas discharge process; the controller is configured to
   operate the pumping unit, while the valve of the injection nozzle is closed, to supply the reduction-causing agent into the reduction-causing agent supply passage to compress the gas introduced in the reduction-causing agent supply passage;

at an elapse of a predetermined fourth set time after the pumping unit starts to be operated, open the valve of the injection nozzle to discharge the compressed gas into the exhaust pipe through the injection nozzle, and at an elapse of a predetermined fifth set time after the pumping unit starts to be operated, close the valve of the injection nozzle.

3. The reduction-causing agent supply device according to claim 1, further comprising:

a pressure gauge configured to measure a pressure in the reduction-causing agent supply passage, wherein in the reduction-causing agent drawing-back process, the controller is configured to operate the drawing-back unit, while the valve of the injection nozzle is closed, to draw back the reduction-causing agent present inside the reduction-causing agent supply passage toward the tank;

when a value measured by the pressure gauge reaches a predetermined first pressure value after the drawing-back unit starts to be operated, open the valve of the injection nozzle to introduce the gas present inside the exhaust pipe into the injection nozzle and the reduction-causing agent supply passage;

when the value measured by the pressure gauge reaches a predetermined second pressure value higher than the first pressure value, stop the drawing-back unit; and when the value measured by the pressure gauge reaches a predetermined third pressure value higher than the second pressure value, close the valve of the injection nozzle, and in the compressed gas discharge process; the controller is configured to operate the pumping unit, while the valve of the injection nozzle is closed, to supply the reduction-causing agent into the reduction-causing agent supply passage to compress the gas introduced in the reduction-causing agent supply passage;

when the value measured by the pressure gauge reaches a predetermined fourth pressure value higher than the third pressure value, open the valve of the injection nozzle to discharge the compressed gas into the exhaust pipe through the injection nozzle, and when the value measured by the pressure gauge reaches a predetermined fifth pressure value higher than the third pressure value and lower than the fourth pressure value, close the valve of the injection nozzle.

4. The reduction-causing agent supply device according to claim 3, wherein the first pressure value, the second pressure value, the third pressure value, the fourth pressure value and the fifth pressure value are values calculated based on an inner diameter and a length of the reduction-causing agent supply passage, a volume of each of the pumping unit and the drawing-back unit, and a volume of the injection nozzle.

5. The reduction-causing agent supply device according to claim 1, wherein after the engine is stopped, the controller is configured to repeat the reduction-causing agent drawing-back process and the compressed gas discharge process for a plurality of times and subsequently perform the reduction-causing agent drawing-back process.

6. A control method of a reduction-causing agent supply device comprising: a tank configured to store a reduction-causing agent to be supplied into an exhaust pipe of an engine; a pumping unit comprising a pump configured to pump the reduction-causing agent stored in the tank; a reduction-causing agent supply passage configured to supply the pumped reduction-causing agent; an injection nozzle configured to inject the reduction-causing agent supplied through the reduction-causing agent supply passage into the exhaust pipe; a drawing-back unit comprising the pump and a switching valve and being configured to draw back the reduction-causing agent present inside the reduction-causing agent supply passage toward the tank, the control method comprising:

after the engine is stopped, operating the drawing-back unit, while a valve of the injection nozzle is closed, to draw back the reduction-causing agent present inside the reduction-causing agent supply passage toward the tank;

operating the drawing-back unit, while the valve of the injection nozzle is open, to introduce gas present inside the exhaust pipe into the injection nozzle and the reduction-causing agent supply passage;

operating the pumping unit, while the valve of the injection nozzle is closed, to supply the reduction-causing agent into the reduction-causing agent supply passage to compress the gas introduced in the reduction-causing agent supply passage;

opening the valve of the injection nozzle to discharge the compressed gas into the exhaust pipe through the injection nozzle, and closing the valve of the injection nozzle before the reduction-causing agent present inside the reduction-causing agent supply passage reaches the injection nozzle while the pump is kept in operation.

7. A reduction-causing agent supply device, comprising:

a tank configured to store a reduction-causing agent to be supplied into an exhaust pipe of an engine;

a pumping unit comprising a discharging pump configured to pump the reduction-causing agent stored in the tank;

a reduction-causing agent supply passage configured to supply the pumped reduction-causing agent;

an injection nozzle configured to inject the reduction-causing agent supplied through the reduction-causing agent supply passage into the exhaust pipe;

a drawing-back unit comprising a drawing-back pump configured to draw back the reduction-causing agent present inside the reduction-causing agent supply passage toward the tank; and a controller configured to control an operation of each of the pumping unit, the injection nozzle and the drawing-back unit, wherein the controller is configured to perform a reduction-causing agent drawing-back process and a compressed gas discharge process, after the engine is stopped, wherein in the reduction-causing agent drawing-back process; the controller is configured to operate the drawing-back unit, while a valve of the injection nozzle is closed, to draw back the reduction-causing agent present inside the reduction-causing agent supply passage toward the tank; and operate the drawing-back unit, while the valve of the injection nozzle is open, to introduce gas present inside the exhaust pipe into the injection nozzle and the reduction-causing agent supply passage, and in the compressed gas discharge process; the controller is configured to operate the pumping unit, while the valve of the injection nozzle is closed, to supply the reduction-causing agent into the reduction-causing agent supply passage to compress the gas introduced in the reduction-causing agent supply passage;

open the valve of the injection nozzle to discharge the compressed gas into the exhaust pipe through the injection nozzle; and close the valve of the injection nozzle before the reduction-causing agent present inside the reduction-causing agent supply passage reaches the injection nozzle while the discharging pump is kept in operation.

8. The reduction-causing agent supply device according to claim 7, wherein in the reduction-causing agent drawing-back process; the controller is configured to operate the drawing-back unit, while the valve of the injection nozzle is closed, to draw back the reduction-causing agent present inside the reduction-causing agent supply passage toward the tank;

at an elapse of a predetermined first set time after the drawing-back unit starts to be operated, open the valve of the injection nozzle to introduce the gas present inside the exhaust pipe into the injection nozzle and the reduction-causing agent supply passage;

at an elapse of a predetermined second set time after the drawing-back unit starts to be operated, stop the drawing-back unit; and at an elapse of a predetermined third set time after the drawing-back unit starts to be operated, close the valve of the injection nozzle, and in the compressed gas discharge process; the controller is configured to operate the pumping unit, while the valve of the injection nozzle is closed, to supply the reduction-causing agent into the reduction-causing agent supply passage to compress the gas introduced in the reduction-causing agent supply passage;

at an elapse of a predetermined fourth set time after the pumping unit starts to be operated, open the valve of the injection nozzle to discharge the compressed gas into the exhaust pipe through the injection nozzle, and at an elapse of a predetermined fifth set time after the pumping unit starts to be operated, close the valve of the injection nozzle.

9. The reduction-causing agent supply device according to claim 7, further comprising:

a pressure gauge configured to measure a pressure in the reduction-causing agent supply passage, wherein in the reduction-causing agent drawing-back process, the controller is configured to operate the drawing-back unit, while the valve of the injection nozzle is closed, to draw back the reduction-causing agent present inside the reduction-causing agent supply passage toward the tank;

when a value measured by the pressure gauge reaches a predetermined first pressure value after the drawing-back unit starts to be operated, open the valve of the injection nozzle to introduce the gas present inside the exhaust pipe into the injection nozzle and the reduction-causing agent supply passage;

when the value measured by the pressure gauge reaches a predetermined second pressure value higher than the first pressure value, stop the drawing-back unit; and when the value measured by the pressure gauge reaches a predetermined third pressure value higher than the second pressure value, close the valve of the injection nozzle, and in the compressed gas discharge process; the controller is configured to operate the pumping unit, while the valve of the injection nozzle is closed, to supply the reduction-causing agent into the reduction-causing agent supply passage to compress the gas introduced in the reduction-causing agent supply passage;

when the value measured by the pressure gauge reaches a predetermined fourth pressure value higher than the third pressure value, open the valve of the injection nozzle to discharge the compressed gas into the exhaust pipe through the injection nozzle, and when the value measured by the pressure gauge reaches a predetermined fifth pressure value higher than the third pressure value and lower than the fourth pressure value, close the valve of the injection nozzle.

10. The reduction-causing agent supply device according to claim 9, wherein the first pressure value, the second pressure value, the third pressure value, the fourth pressure value and the fifth pressure value are values calculated based on an inner diameter and a length of the reduction-causing agent supply passage, a volume of each of the pumping unit and the drawing-back unit, and a volume of the injection nozzle.

11. The reduction-causing agent supply device according to claim 7, wherein after the engine is stopped, the controller is configured to repeat the reduction-causing agent drawing-back process and the compressed gas discharge process for a plurality of times and subsequently perform the reduction-causing agent drawing-back process.

* * * * *